US007702913B2

(12) United States Patent
Serani et al.

(10) Patent No.: US 7,702,913 B2
(45) Date of Patent: Apr. 20, 2010

(54) INTERACTIVE SECURITY CONTROL SYSTEM WITH REAL TIME ACTIVITY REPORTS

(75) Inventors: Scott M. Serani, Broomfield, CO (US); Leslie S. McMillin, Littleton, CO (US); Charles D. Blish, III, Arvada, CO (US)

(73) Assignee: Shield Security Systems, LLC, Denver, CO (US)

( * ) Notice: Subject to any disclaimer, the term of this patent is extended or adjusted under 35 U.S.C. 154(b) by 1269 days.

(21) Appl. No.: 11/214,130

(22) Filed: Aug. 29, 2005

(65) Prior Publication Data

US 2006/0020817 A1     Jan. 26, 2006

Related U.S. Application Data

(63) Continuation-in-part of application No. 09/925,672, filed on Aug. 10, 2001, now Pat. No. 7,120,935.

(60) Provisional application No. 60/605,638, filed on Aug. 30, 2004, provisional application No. 60/224,561, filed on Aug. 10, 2000.

(51) Int. Cl.
  *G06F 17/30* (2006.01)
  *E05B 53/00* (2006.01)
  *G06F 21/00* (2006.01)

(52) U.S. Cl. .................... 713/182; 726/27; 70/263; 70/264

(58) Field of Classification Search ................ None
See application file for complete search history.

(56) References Cited

U.S. PATENT DOCUMENTS

| 4,741,188 | A | | 5/1988 | Smith |
|---|---|---|---|---|
| 5,319,362 | A | * | 6/1994 | Hyatt, Jr. .................... 340/5.33 |
| 5,375,444 | A | | 12/1994 | Smith |
| 5,774,058 | A | * | 6/1998 | Henry et al. .................. 340/5.5 |
| 5,926,756 | A | | 7/1999 | Piosenka et al. |
| 6,058,391 | A | | 5/2000 | Gardner |
| 6,075,861 | A | | 6/2000 | Miller, II |
| 6,144,959 | A | | 11/2000 | Anderson et al. |
| 6,392,538 | B1 | | 5/2002 | Shere |
| 6,457,007 | B1 | | 9/2002 | Kikuchi et al. |
| 6,834,276 | B1 | | 12/2004 | Jensen et al. |

(Continued)

OTHER PUBLICATIONS

Instakey Lock Corporation, Records Management System Manual, 1996, 1997, 1998, 1999.

(Continued)

*Primary Examiner*—Matthew B Smithers
(74) *Attorney, Agent, or Firm*—Wood, Herron & Evans LLP

(57) ABSTRACT

An interactive system for managing access via a communications network by one or more Device-Users and Database-Users with regard to at least one secured Location and an entry control Device assignable for use in gaining access to the Location by the one or more Device-Users. The system may include a searchable database configured to store information on at least one of the secured Location, the one or more Device-Users, the one or more Database-Users or the entry control Device. Software is configured to produce a real time activity report on a selected portion of the stored information during a time period selected by the one or more Database-Users.

31 Claims, 26 Drawing Sheets

U.S. PATENT DOCUMENTS

| | | | |
|---|---|---|---|
| 6,880,754 | B1 | 4/2005 | Lie-Nielsen et al. |
| 6,882,282 | B1 | 4/2005 | Lie-Nielsen et al. |
| 6,990,586 | B1 | 1/2006 | Tresser et al. |
| 7,069,446 | B2 * | 6/2006 | Wiederin et al. ............ 713/189 |
| 7,174,311 | B1 | 2/2007 | Galietti |
| 2002/0023232 | A1 | 2/2002 | Serani et al. |
| 2002/0144021 | A1 * | 10/2002 | Pigos et al. ................. 709/330 |
| 2003/0071715 | A1 | 4/2003 | Lavelle et al. |
| 2005/0096530 | A1 | 5/2005 | Daw et al. |
| 2006/0020817 | A1 | 1/2006 | Serani et al. |
| 2006/0123486 | A1 | 6/2006 | Serani et al. |
| 2006/0137026 | A1 | 6/2006 | Serani et al. |
| 2006/0206719 | A1 | 9/2006 | Serani et al. |
| 2006/0268758 | A1 | 11/2006 | Serani et al. |
| 2007/0298772 | A1 | 12/2007 | Owens et al. |

OTHER PUBLICATIONS

Instakey Lock Corporation, Uncompromised Key Security, Aug. 19, 2002.
Instakey Lock Corporation, Web Software Reference Guide, Part 1, pp. 1-17, Jul. 12, 2002.
Instakey Lock Corporation, Web Software Reference Guide, Part 2, pp. 18-35, Jul. 12, 2002.
Instakey Lock Corporation, Web Software Reference Guide, Part 3, pp. 36-51, Jul. 12, 2002.
SECURITYINFOWATCH.COM, Surfing Your Building—Jan. 2006 Issue, 5 pgs.

* cited by examiner

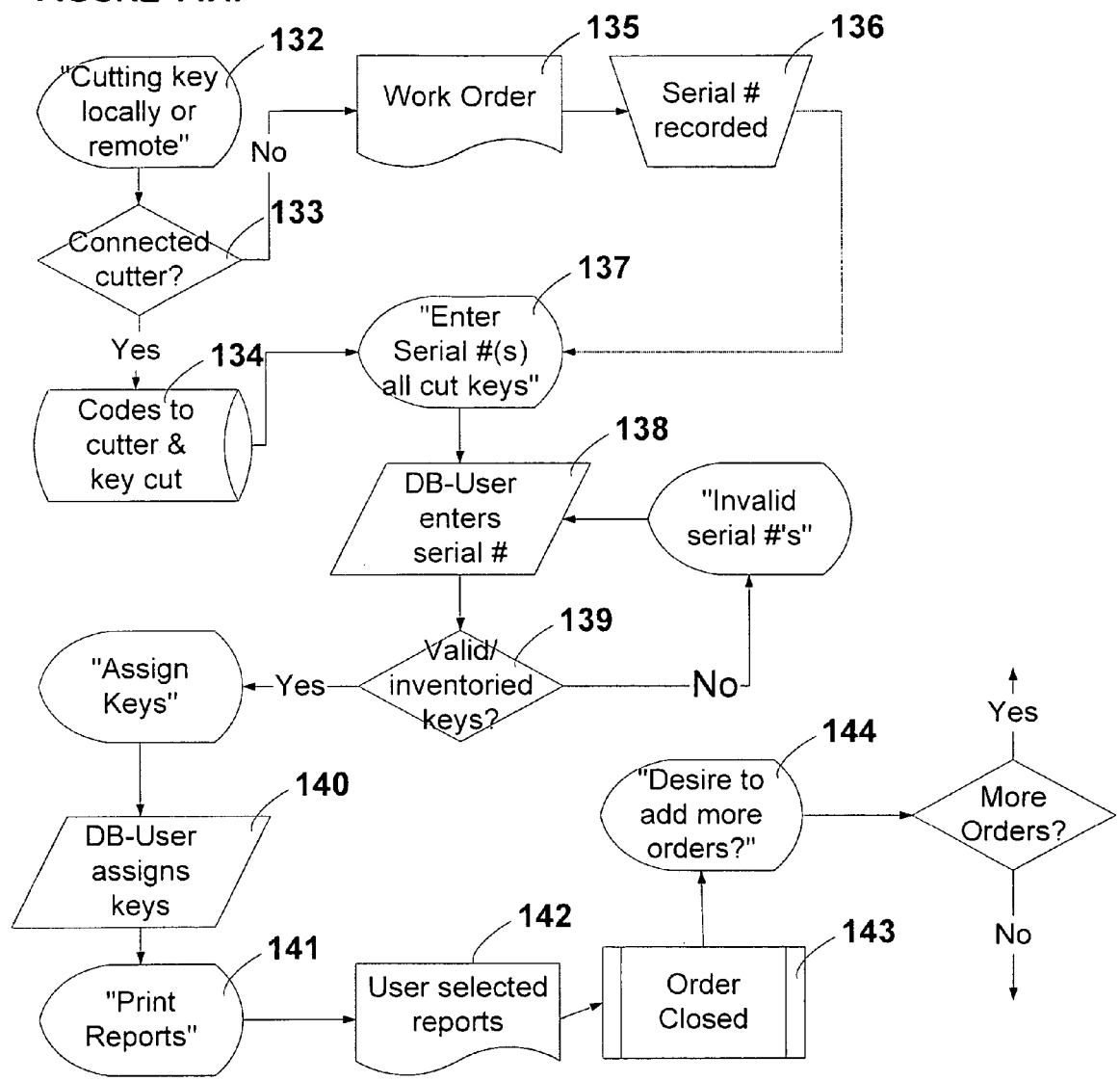

FIGURE 24

| | Primary Screen 1 | | | Primary Screen 2 | | | | | | | | | | Primary Screen 3 | | |
|---|---|---|---|---|---|---|---|---|---|---|---|---|---|---|---|---|
| | Variation | | | Variation | | | | | | | | | | Variation | | |
| | 1 | 2 | 3 | 1 | 2 | 3 | 4 | 5 | 6 | 7 | 8 | 9 | 10 | 1 | 2 | |
| DB-User 1 | X | | | X | | | | | | | | | | X | | |
| DB-User 2 | X | | | | X | | | | | | | | | X | | |
| DB-User 3 | | X | | | | | X | | | | | | | | | |
| DB-User 4 | | X | | | | X | | | | | | | | | X | |
| DB-User 5 | X | | | | | X | | | | | | | | | | |
| DB-User 6 | | X | | | | | | X | | | | | | X | | |
| DB-User 7 | | X | | | | | | | X | | | | | X | | |
| DB-User 8 | | | X | | | | | | | X | | | | | X | |
| DB-User 9 | | X | | | | | | | | | X | | | | | |
| DB-User 10 | | | X | | | | | | | | | X | | | | |
| etc. | | | | | | | | | | | | | | | | |

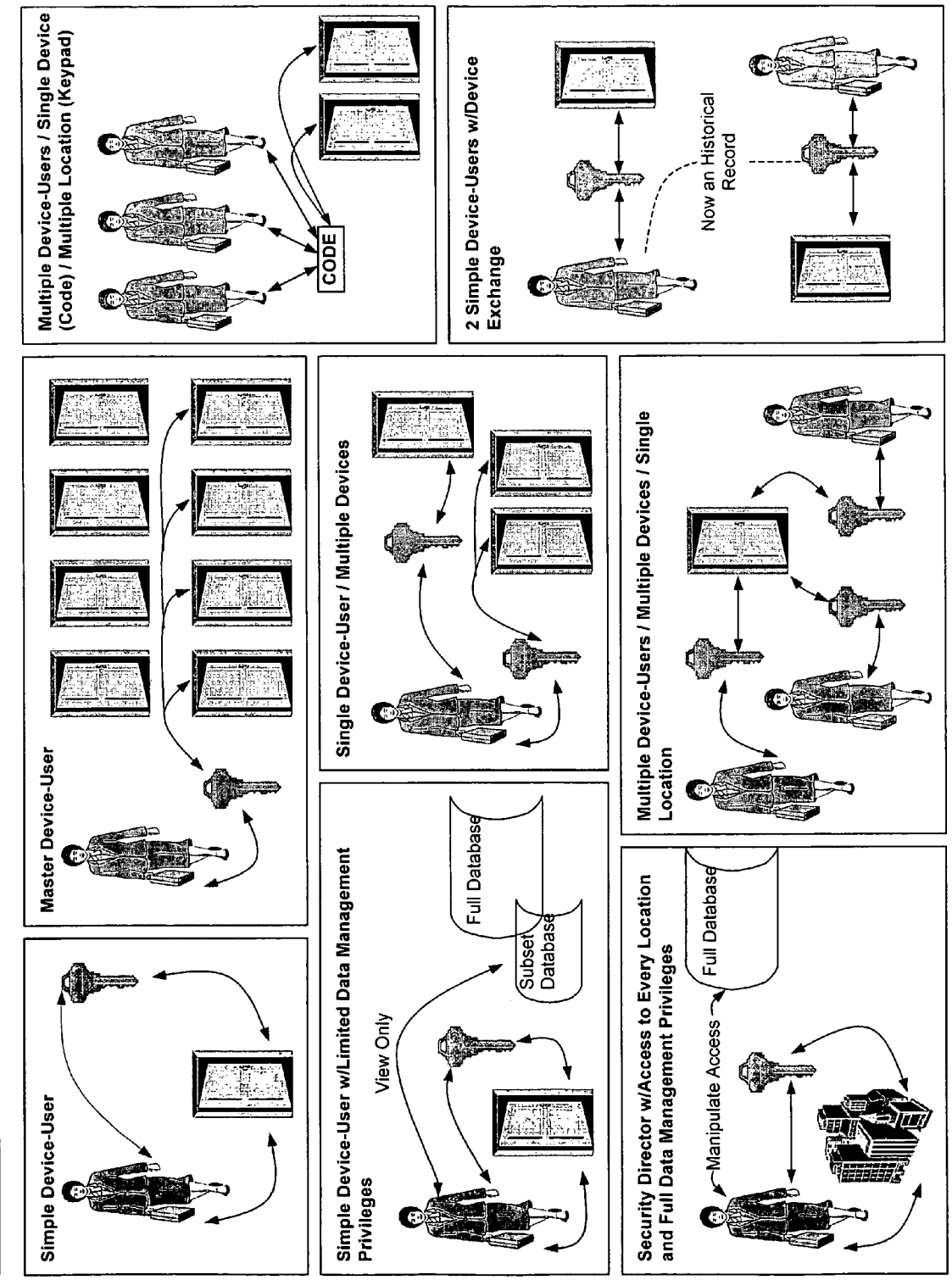

INTERACTIVE SECURITY CONTROL SYSTEM WITH REAL TIME ACTIVITY REPORTS

CROSS REFERENCE TO RELATED APPLICATIONS

This application claims the benefit of Provisional Ser. No. 60/605,638, filed Aug. 30, 2004 and is a Continuation-in-Part of U.S. application Ser. No. 09/925,672 (the '672 patent application), filed Aug. 10, 2001, now U.S. Pat. No. 7,120,935 currently pending, which claims the benefit of Provisional Ser. No. 60/224,561, filed Aug. 10, 2000, now abandoned, the disclosures of which are each hereby fully incorporated herein by reference.

BACKGROUND

This invention relates to on-line entry control systems and more particularly relates to a novel and improved online interactive method and system for tracking and maintaining keys or other entry control devices in a reliable and secure manner.

Key management programs have been in existence for many years. First came the invention of pin tumbler lock cylinders that gave security professionals the ability to alter the internal configuration of the pins inside the cylinder and cut related keys to that combination in order to effect a change in Users having access to a particular Location. Following that invention came the development of interchangeable cores that allowed program managers to physically move the Location of an existing lock cylinder to a different Location and thus again achieve the ability to control the access of Users into various Locations.

Initially, program managers began seeking control over the ability to duplicate keys and thus minimize the inherent security breach of five keys turning into six keys without proper authority. Manufacturers in the industry focused attention on various forms of restricting access to key blanks in order to offer program managers the confidence that keys could not be duplicated without a program manager's specific approval.

Initially Lock Corporation of Denver, Colo. previously devised a lock cylinder that permits authorized Users to re-key each lock when necessary. For example, when a key is lost or stolen, it is necessary only to insert a replacement key into the lock, turn it 180 degrees and remove it along with a wafer from the lock cylinder's pinning. Upon removal of the wafer, only new keys matched to the replacement key will now open the lock. Such a rekeying operation is hereinafter referred to as a "step change." The operation can be repeated a preset number of times depending upon the number of wafers in the cylinder that are removable by different replacement keys and then the cylinder can be easily re-pinned through another designed sequence of steps.

Independent levels of master keying can be incorporated into the re-keyable lock cylinder as described so that User level keys (also referred to as change keys) can be changed without affecting master keys and vice-versa; also, only the people directly affected by the missing key need to receive new keys thereby avoiding a situation where a manager could end up with a number of keys resulting from changes in several User doors for which he or she is responsible. Different levels of security have been incorporated into the system described including (1) making key blanks available only through authorized sources; and (2) placing a serial number on each key to permit tracking of all keys within a system so that, if a key is found or returned, it can be determined whether it is the one believed to have been missing and whether there is a need to re-key.

The foregoing is given more as a setting for the present invention and is merely representative of various types of entry control devices conformable for use in a secure, online entry control system. However, utilizing a lock cylinder of the type described with the ability to rekey each cylinder and to track the identity and whereabouts of each key lent itself particularly well to use in combination with a computer program which enabled a customer to establish its own database for tracking and maintaining its keys and limiting access to one or more Locations by selected Users. One such program is described in the Records Management System Manual of InstaKey Lock Corporation, Englewood, Colo. and is incorporated by reference herein. Nevertheless, there is a continuing need for a data processing system which is capable of using the Internet and/or intranet in conjunction with a relational database in monitoring and recording the information flow and data related to an access control system so that immediate attention and correction can be given to a problem that may arise virtually at any time in different parts of the world. More specifically, there is a continuing need for a data processing system to dynamically link entry control devices, such as, a key to Users to Locations such that access to each Location is controlled and known on a real time basis. In providing such a system, it is important that the data processing system be capable of maintaining current and historical data on each of the three primary components (Devices, Locations and Users) so that the complete history of any component is accessible to authorized Users and complete security is established in order to control access to specific data and information on a "need-to-know" basis.

At least some database users would find it helpful to monitor activity such as new lock installations, rekeying of locks, etc., in a real time manner. In other cases it may be desirable to monitor actual activity by Location, or to perform accounting or auditing for a selected period of time.

SUMMARY

The present invention generally provides an interactive system for managing access via a communications network by one or more Device-Users and Database-Users with regard to at least one secured Location and an entry control device assignable for use in gaining entry to the Location by the one or more Device-Users. The system may comprise a searchable database configured to store information on at least one of the secured Locations, the one or more Device-Users, the one or more Database-Users or the entry control Device. Software is provided and stored on a readable medium and may be used to produce a real time activity report on a selected portion of the stored information during a time period selected by the one or more Database-Users.

Various methods are also provided for allowing the Database-User or Users to view time dependent data of a type selected from at least one of: data on one or more Locations, data on one or more Devices, data on one or more Device-Users, or data on one or more Database-Users, and combinations thereof. The Database-User may use the Software to select the desired type of data and the desired time period associated with the desired type of data for the display or report.

The above and other objects, advantages and features of the present invention will become more readily appreciated and understood from a consideration of the following detailed description of preferred and modified forms of the present invention when taken together with the accompanying drawings in which:

BRIEF DESCRIPTION OF THE DRAWINGS

FIGS. 14 and 14A are a flow diagram representing the placing of an order for a new key or entry control device;

FIG. 24 is a profile table illustrating levels of security in an access control system in accordance with the present invention; and FIG. 25 illustrates examples of different levels of security within the access control system of the present invention.

DETAILED DESCRIPTION OF ILLUSTRATIVE EMBODIMENTS

Figure 1:
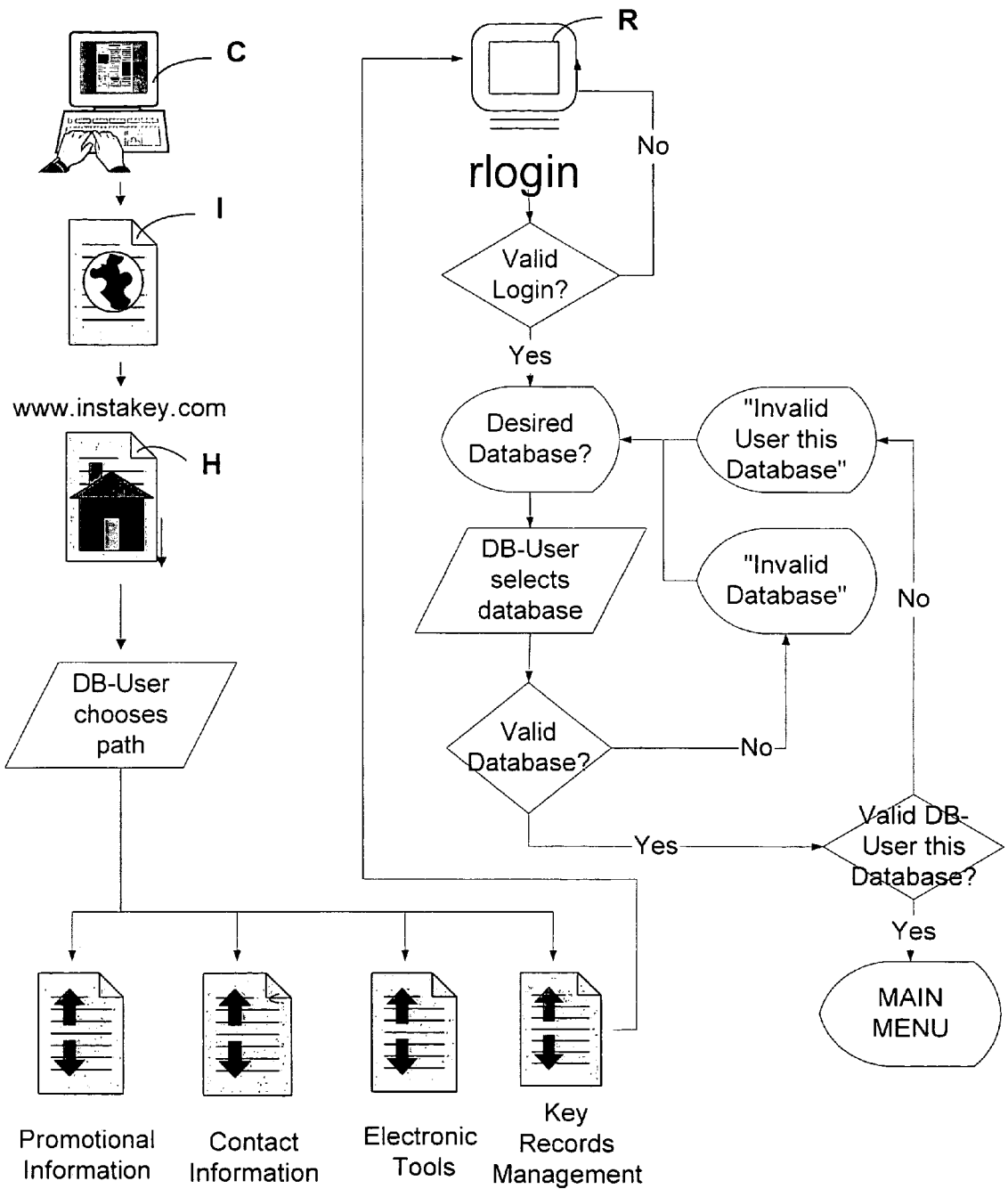
FIG. 1 is a flow diagram of a preferred process for gaining access to a database in accordance with the present invention.

Various terms employed herein have the following meanings:

"Device(s)" are those tangible/intangible objects which allow an authorized Device-User to gain access to a geographic Location (or alternatively, deny access to an unauthorized User). Devices may be tangible items containing encoded criteria which are assigned to and in possession of a Device-User but are independent of the Device-User. Such Devices are portable in that they may be moved from Device-User to Device-User or reconfigured to a different encoded criteria, such as, mechanical key, card such as that utilized in a card access or ATM system, Dallas Chip or other electronic signaling mechanism, and bar codes. Devices may be intangible items of information which are assigned to and in possession of a Device-User, such as, code number(s) utilized in keypad/combination lock processes, PIN numbers utilized in a variety of security and ATM systems, and code words or phrases. Devices may be tangible and irrevocable features of the Device-User thus performing the function of identification (encoding), such as, fingerprints, retina scans, and voice patterns.

"Locations" are places defined as an element of a security system primarily in two categories: (1) a place or heirarchy of levels of access at a given place physically protected by a securing mechanism (mechanical or electronic) and configured to allow entry to a Device-User in possession of a properly configured Device; and (2) any data, records or information at a particular place being used in conjunction with the management of a security system but not necessarily containing a securing mechanism itself, such as, information at a remote facility utilizing the Internet to manage data at corporate headquarters.

"User" is an individual involved with, dependent upon, or utilizing security data composed of Devices, Locations, and Users.

(i) "Device-User" is one type of User which is permitted access to defined Locations by way of the issuance and configuration of Device(s) in the possession of that Device-User, such as, an employee granted access to a department has a key, a contractor having access to the front door carries a card, and a driver opens a gate by way of a padlock combination, etc.

(ii) "Database-User" (DB-User) is an individual specifically authorized to access and/or configure data as it relates to the integration and usage of the security system, such as, security system's database manager, a manager allowed to view access privileges to a Location, and remote security personnel to override a securing mechanism, third party vendor managing/supporting technical aspects, etc. A DB-User may or may not be a Device-User and a Device-User may or may not be a DB-User.

"Software" means computerized elements (hardware, software, communications, etc.) designed for the primary purpose of integrating and managing Devices, Users, and Locations to achieve a desired security effect. Software is a relational database structure linking Users to Devices to Locations in a dynamic environment so as to provide access as required and/or mandated by a security program. Software is designed to be used at a User's own host computer directly or a third party host computer remotely (via a User's own network or the Internet). Software is a fully secured system allowing access to data (all or part) on a "need to know" basis by a DB-User. By DB-User by window, each DB-User can be authorized to View, Add, Modify, and Delete.

"View" is the ability to see system database interrelationships. For example, a security guard may be authorized to view which Device-Users are allowed access to a particular Location, a department manager may be authorized to create a report of all outstanding Devices to his department, a facilities manager may be granted privileges to view all keys issued to contractors, or a loss prevention professional or auditor may be granted access to all issued Devices to all Device-Users in order to confirm data integrity, etc.

"Add" is the ability to physically make additions to the database (new Devices, Device-Users or DB-Users, or Locations). For example, the ability to place an order of a new Device to be issued to a new Device-User, authorization to create all the data necessary for a new Location and thus all the Devices and Device-Users to be associated with that Location, and security clearance to add additional DB-Users to the access control system.

"Modify" is the ability to modify existing database entries. For example, an individual in charge of "temporary Devices" (keys identified as temporary issuance keys) may record the handling of a loaner key to a temporary Device-User and/or the receipt of that loaner key when returned, the ability to record a Device as lost/stolen/found, record the transfer of a Device from one Device-User to another, ability to alter existing Location and/or User data (i.e. type of hardware on a door, PIN number at an ATM or telephone number of a User), and a security director authorized to make changes to the security access of Software by DB-User (View, Modify, Add, Delete).

"Delete" is the ability to physically delete existing database entries. For example, a Location no longer part of the User's security program needs all data related to that Location purged from the database.

"Profile Table" is a parameter driven function, as shown in FIG. 24, that links every display screen of the Software to each DB-User authorized to access a given database. By defining a DB-User's privileges by screen and by function (View, Add, Delete, Modify) and further defining those privileges to all or some portion of a database, those with a need to know can reach the data as authorized. As represented by "X" in FIG. 24, by turning on privileges (V=View, A=Add, D=Delete, M=Modify) by segment of data (a=all, s=some portion) for every screen display (window), access to the data can be fully controlled for each User given a password(s) into the database.

"Hot Link" is a well known term meaning any field or displayed information on a screen which is presented in a blue color and underlined. The process of placing the screen cursor over such Hot Link and clicking the left mouse button automatically transfers program control to the related program function.

Broadly, this invention utilizes the global communication network in conjunction with one or more databases to functionally monitor and record the information flow and data relating to an access control system which links Devices (keys, cards, codes, etc.) to Users (keyholders, cardholders, etc.) to Locations (doors, secured lock boxes, buildings, etc.) such that access through each Location is controlled and known. A system of the present invention can have the ability to maintain current and historical data on each of the three primary components (Devices, Locations, and Users) such that complete history of any component is accessible to an authorized DB-User. Additionally, the system may contain parameter-driven security features which control and limit access to some or all of the data being maintained so as to provide DB-Users with access only to those elements on a "need to know" basis. This system is characterized in particular by its ability to record and maintain the three primary elements, namely, Devices, Locations, and Users in a real time mode. For example, a DB-User in Rome, Italy confronted with an immediate need to add or replace a key to a given Location in Italy may gain immediate access via the global communication network to the Software located in a distant part of the world, such as, Los Angeles, Calif. to interactively communicate with the Software to establish the DB-User's security level, in this case the authorization to Add or Modify a key, and obtain that key in a matter of hours by way of ordering a new Device for the required Location, assigning that Device to a new or existing Device-User, and directing the Software to issue a Device preparation work order to a nearby Device preparation site (in Rome, Italy, e.g. key cutter). Accordingly, the access control system of the present invention is a unique combination of tools that enables authorized DB-Users to dynamically link together the three fundamental elements, namely, Devices, Locations, Users to a selected database via the global communication network; and, depending upon the DB-User's level of security, interactively carry out a function correlated with that level of security in a manner to be hereinafter described in more detail.

Referring in more detail to the drawings, FIG. 1 illustrates the manner in which an authorized DB-User can access the data and information needed to perform a particular job function. The DB-User employs the Software or computer C to connect to the global communication network or Internet I. From there the DB-User proceeds to the home page and is presented with information about the access control system. Of particular importance is that the DB-User must be positively identified in the system. The exemplary manner of accomplishing this positive identification with the present system is by having the DB User login by a prearranged User name and multi-level password. The prearranged User name and passwords are used as identifiers to ensure that an authorized DB-User can proceed. Assuming that the DB-User is authorized to enter via rlogin R, this DB-User will now be constantly confirmed as to which data, screens, and functions are allowed. Specifically, in the routines outlined, once the login is determined to be valid, the DB-User can access a desired database or level of security and is then able to proceed to the Main Menu.

Figure 2:
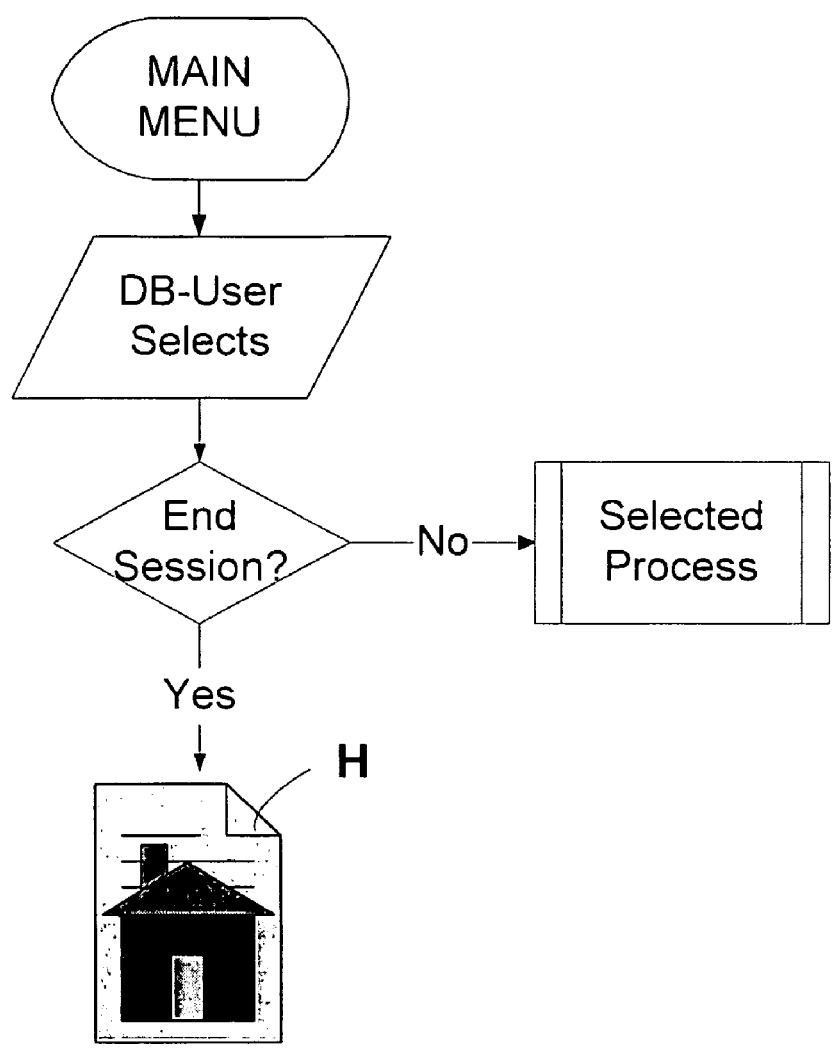
FIG. 2 is another flow diagram illustrating the manner in which a session has ended in accordance with the present invention.
Figure 3:
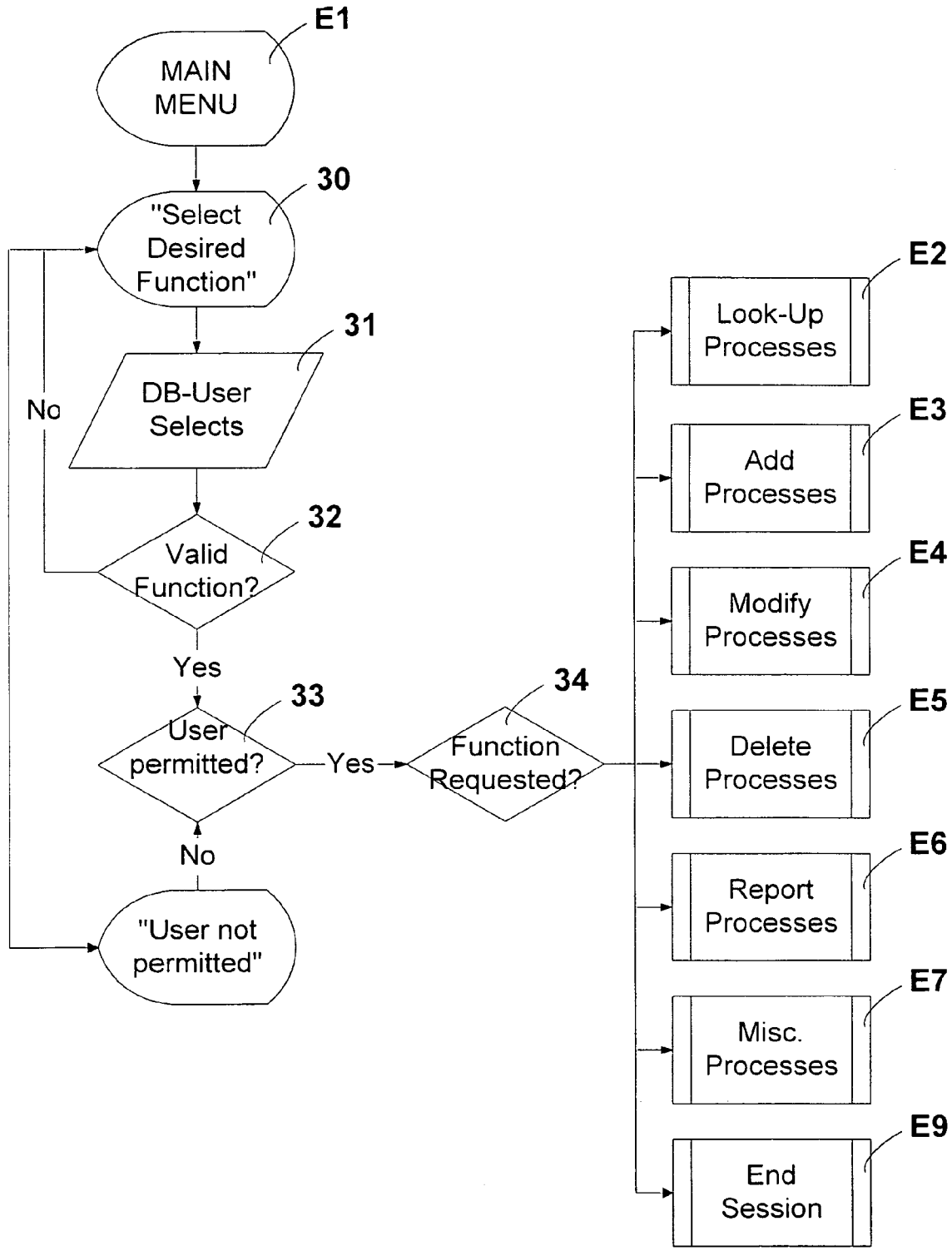
FIG. 3 is a flow diagram representing the process of confirming a selection from the main menu followed by verification of authority.

As illustrated in FIG. 2, the DB-User has the option to select a session termination, and, if selected, is logged off and is now back to the home page H illustrated in FIG. 1. Otherwise, if the requested database is valid for the DB-User, he is then presented with the main menu screen at E1 from which it is possible to maneuver to the function to be performed, as illustrated in FIG. 3. The DB-User is asked to select a function as at 30, and the requested function 31 is first verified to be a valid function as at 32. If not, the DB-User is asked to input once again. Once a valid function is input, a security check is processed at 33 to confirm that the DB-User has the privileges granted to ask for the requested function. For example, a security guard may be permitted to look up data about a specific Device-User but is not allowed to manipulate such data. In contrast, a director of security for the entire program may have full privileges to those having access to a particular office even though he does not have privileges to that office. Most importantly, the DB-User has the ability to access controlled data delivered in a real time and controlled venue from any Location in the world and to request a particular function at 34, namely, those designated at E2 through E7 and E9 as more fully shown in FIGS. 4 to 19 and as hereinafter described in more detail.

Figure 23:
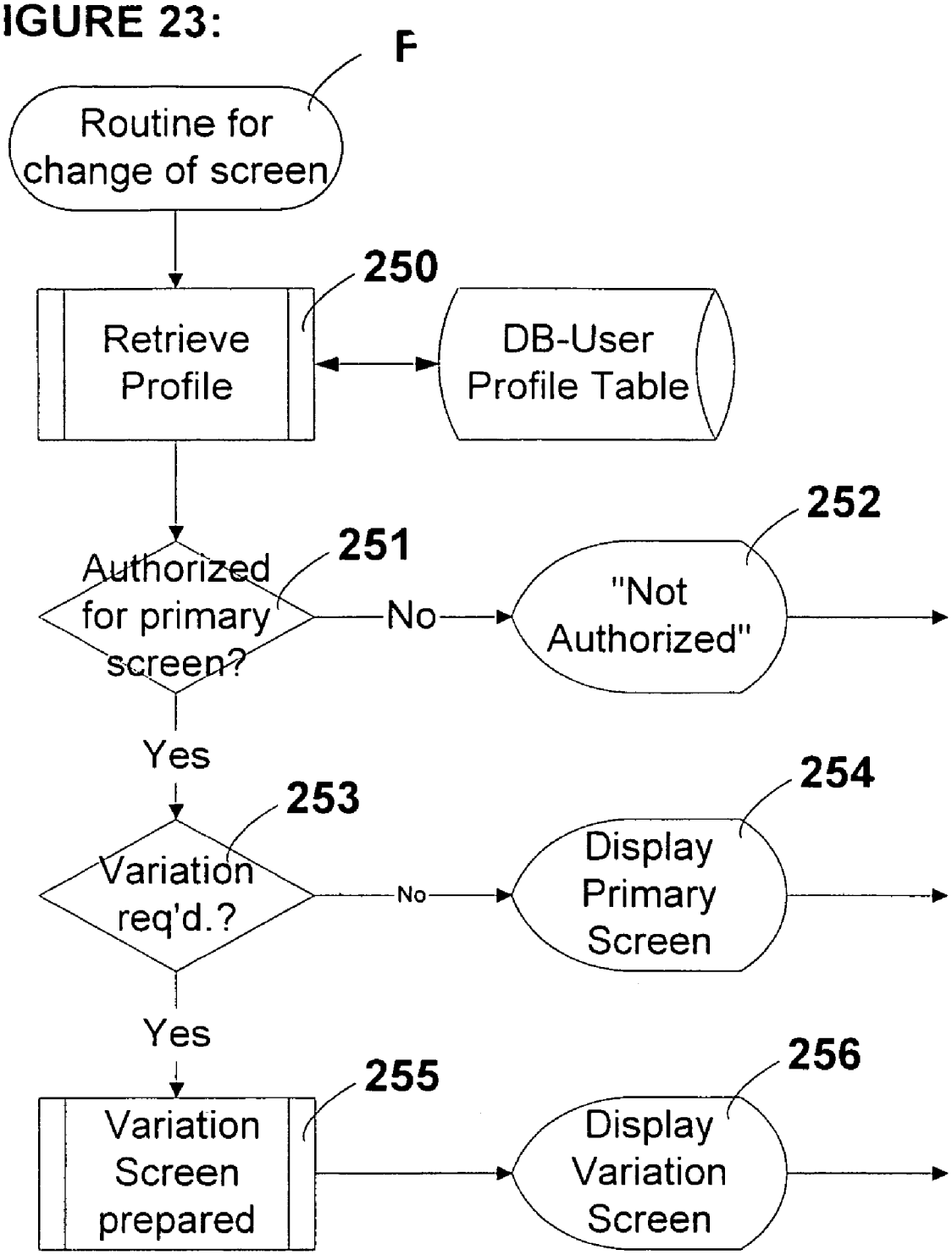
FIG. 23 is a flow diagram of a User validation process.

FIG. 23 illustrates a fundamental decision process used throughout the Software to control access to functions and data in exact accordance with preestablished criteria by each authorized DB-User. From wherever this routine has been called as designated at F, the User profile and screen privileges for the current DB-User is retrieved from the Profile Tables at 250. At 251, the Software compares the requested primary screen to the authorization for such primary screen in the tables. If the DB-User is not authorized for this primary screen at 252, a message is displayed accordingly and program logic reverted to the point from which the request was made initially. If authorized, the Software at 253 further determines if a screen Variation is required. If a primary screen is authorized, the primary screen is displayed at 254 and program logic returned to the point from which this routine was invoked. If a screen Variation is required based on the definition in the Security Access Tables, the Variation is formulated at 255, displayed at 256 and program logic returned to the point from which this routine was invoked.

Figure 4:
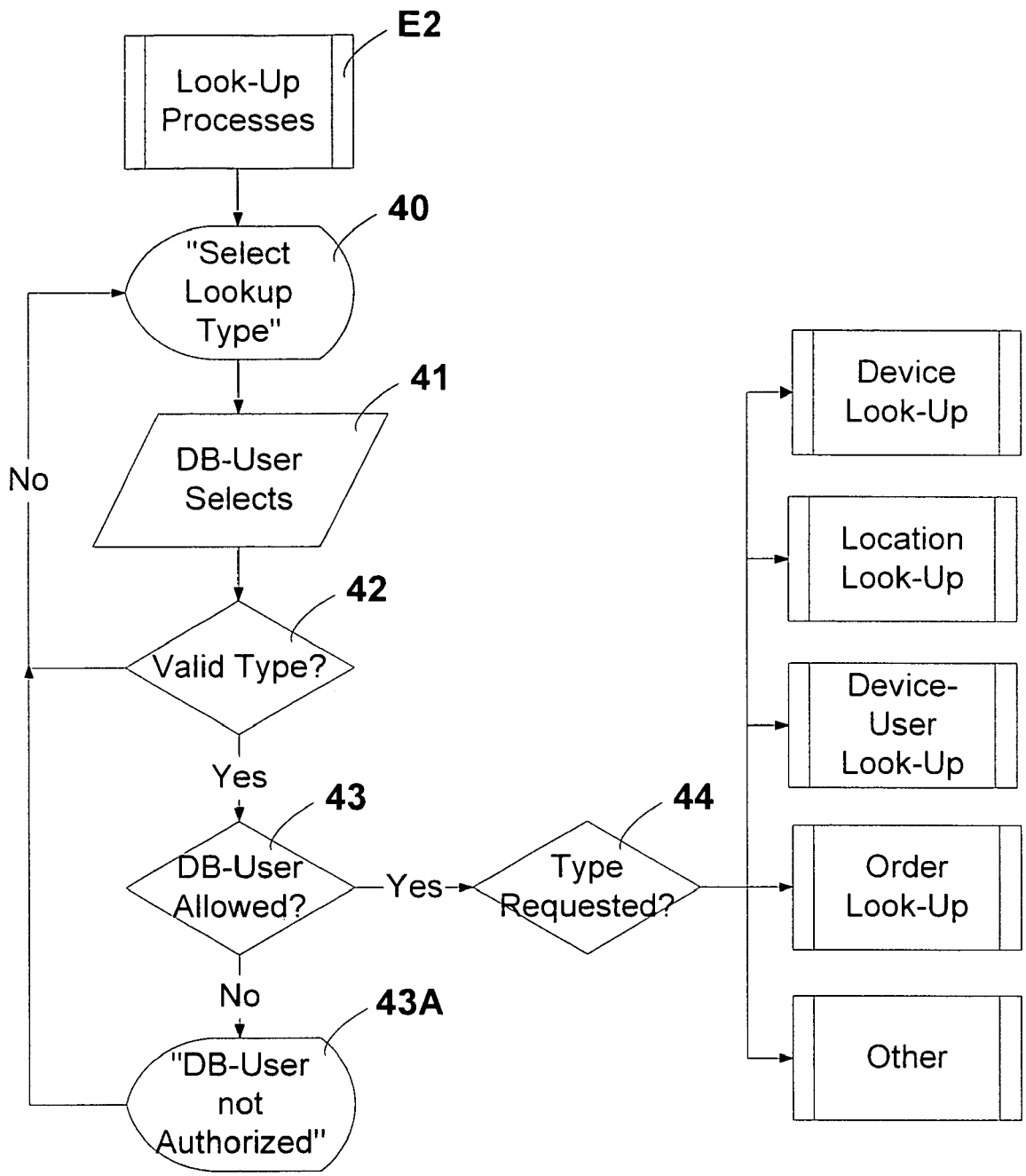
FIG. 4 is a flow diagram directed to the decision process involved in determining the type of look-up desired and verification that the User has authority for such look-up.

By way of introduction, there are a variety of predefined processes to deliver information on a screen associated with the Software that answers to common access control questions, as typified by FIGS. 4 though 9. FIG. 4 illustrates one branch used to determine the type of look-up the DB-User wishes to pursue and is presented with a menu of different selections or choices as designated at 40. A selection is made and validated at 41 and 42, then confirmed at 43, as shown in FIG. 23, that the DB-User is authorized for a particular request. Thus, for example, a security guard may be authorized to look up a particular Device to confirm ownership, but the same person may not be allowed to view a Location. If the DB-User is not authorized as at 43A, must then reselect at 40; otherwise, if authorized as at 44, may select one of the selections as illustrated in FIGS. 5, 6, 7, 8 or 9 to be described.

Figure 5:
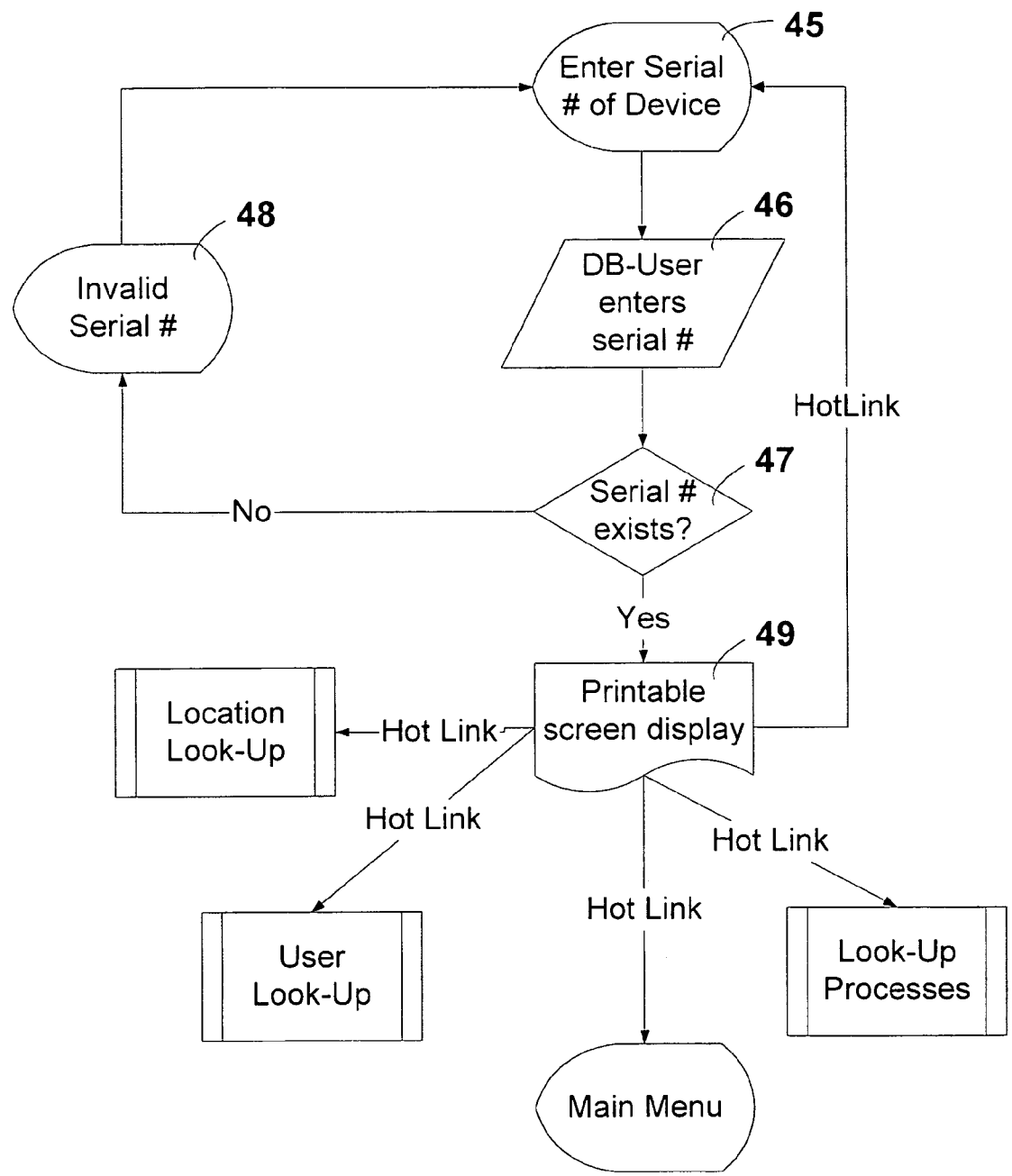
FIG. 5 is a flow diagram representing a look-up device.

In FIG. 5, one example is given in which a key was found and a Database-User must establish its ownership and the door which it operates. Thus, someone with proper authority must look up information about the Device or key found. The Software will request the serial number or other ID of the Device to be entered as at 45 and 46. The key number is validated as a proper number for this database as at 47 or if invalid at 48. If valid, a screen appears as at 49 displaying the designated Device-User, relevant Locations for the Device, date of issue and other information. Other associated data linked to the Device may be hot linked on the screen to make further investigation easy on the part of the DB-User, once the DB-User has been determined to be authorized for such access via FIG. 23. Thus, the screen at 49 can automatically create hot links to listed locations and user if more indepth look-up is desired. The screen at 49 also offers the ability to go back to the main menu or to additional lookups via the hot links as indicated.

The Location Look-Up as indicated at FIG. 5 offers a variety of look-up possibilities by Location, such as, lost key to front door of a Location, need to re-key or burglary committed, need to know who has access; or security director needs to know what Users are involved.

Figure 6:
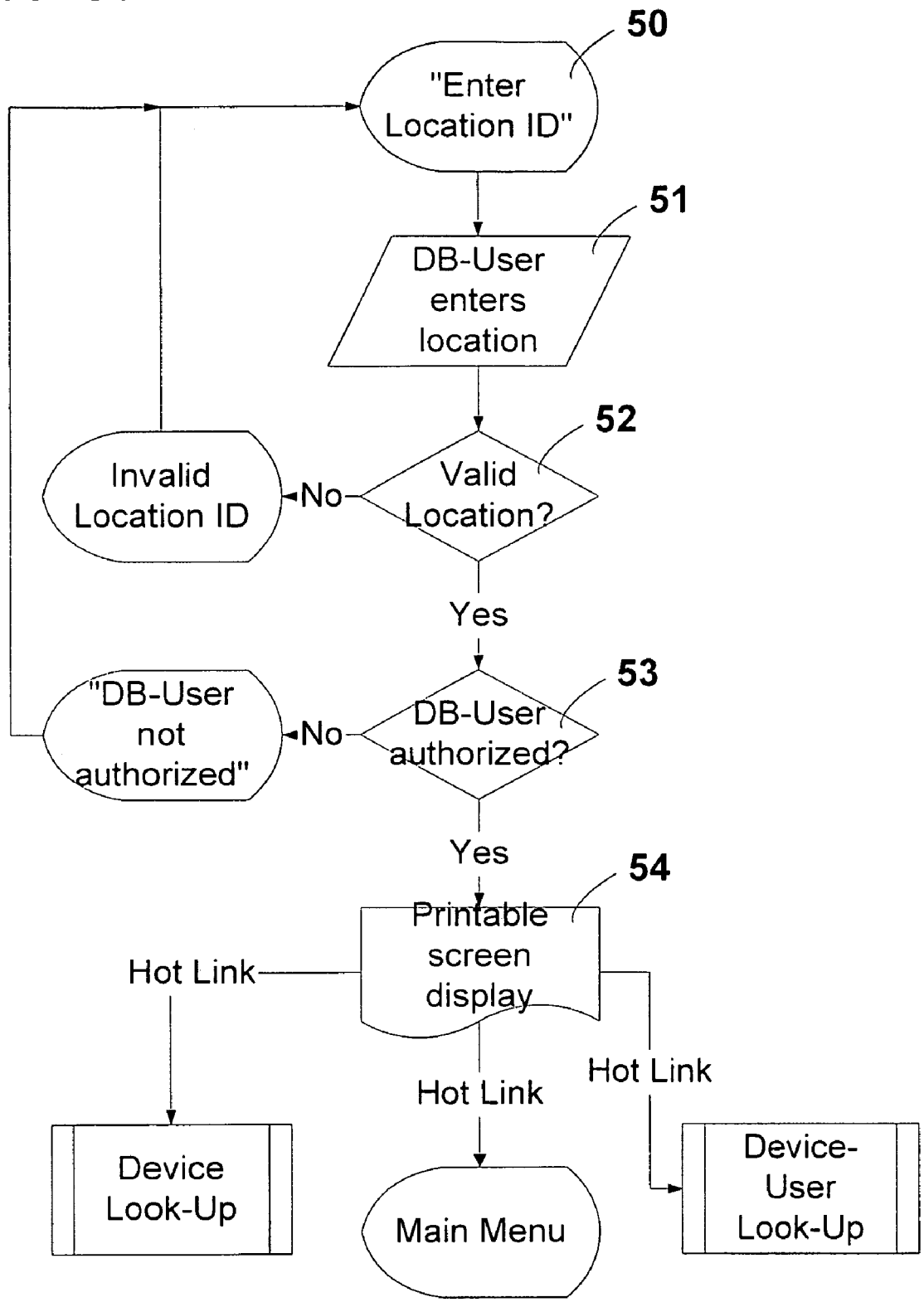
FIGS. 6 to 9 are flow diagrams representing other look-up possibilities.

FIG. 6 illustrates a similar scenario for a lost key in which the Location is requested at 50 and entered at 51. A variety of easy enter modes exist include character recognition and pulldown menus when the DB-User enters the Location. If the Location is valid as at 52 and DB-User authorized as at 53, a screen appears indicating Location data. Any associated data linked to the Location or hot linked on the screen as designated at 54, facilitate investigation on the part of the DB-User as further illustrated in more detail in FIG. 6. Again, the screen at 54 creates hot links to listed devices and user if more in-depth look-up is desired on this situation. The screen 54 also offers the ability to go back to the main menu or additional look-ups.

Figure 7:
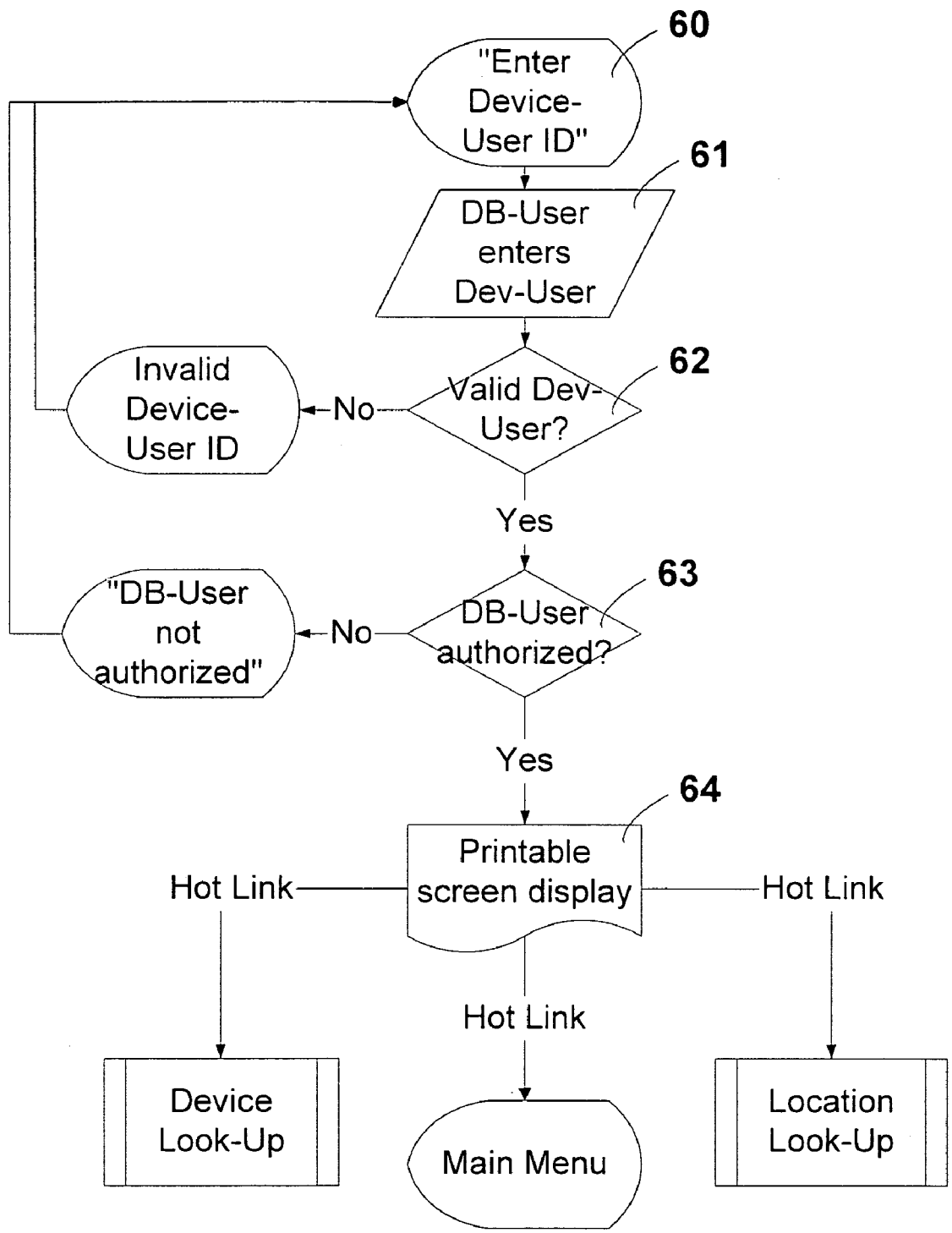

FIG. 7 illustrates a sample process for looking up information about a particular Device-User, for example, if that Device-User should report that a key has been stolen, and need to know all keys currently issued to this User or need to know every key ever held by this User. Thus, the identification of the Device-User in question is entered at 60 together with related information as in 61. If that Device-User is valid as at 62, a determination is made whether the DB-User has proper authority to access the information about the Device-User via FIG. 23 and as designated at 63. If validated, a screen will appear as at 64 indicating Device-User profile and related data for the Device-User claiming to have lost a key. The DB-User making the investigation will be provided with the information needed to make an intelligent security decision as to whether to rekey the Location and if so, how many other Locations may be affected and how many keys will be needed for related Device-Users. For this purpose, the screen automatically creates hot links to listed Devices and Locations if more in-depth look-up is desired. The screen also offers the ability to go back to main menu or additional look-ups.

Figure 8:
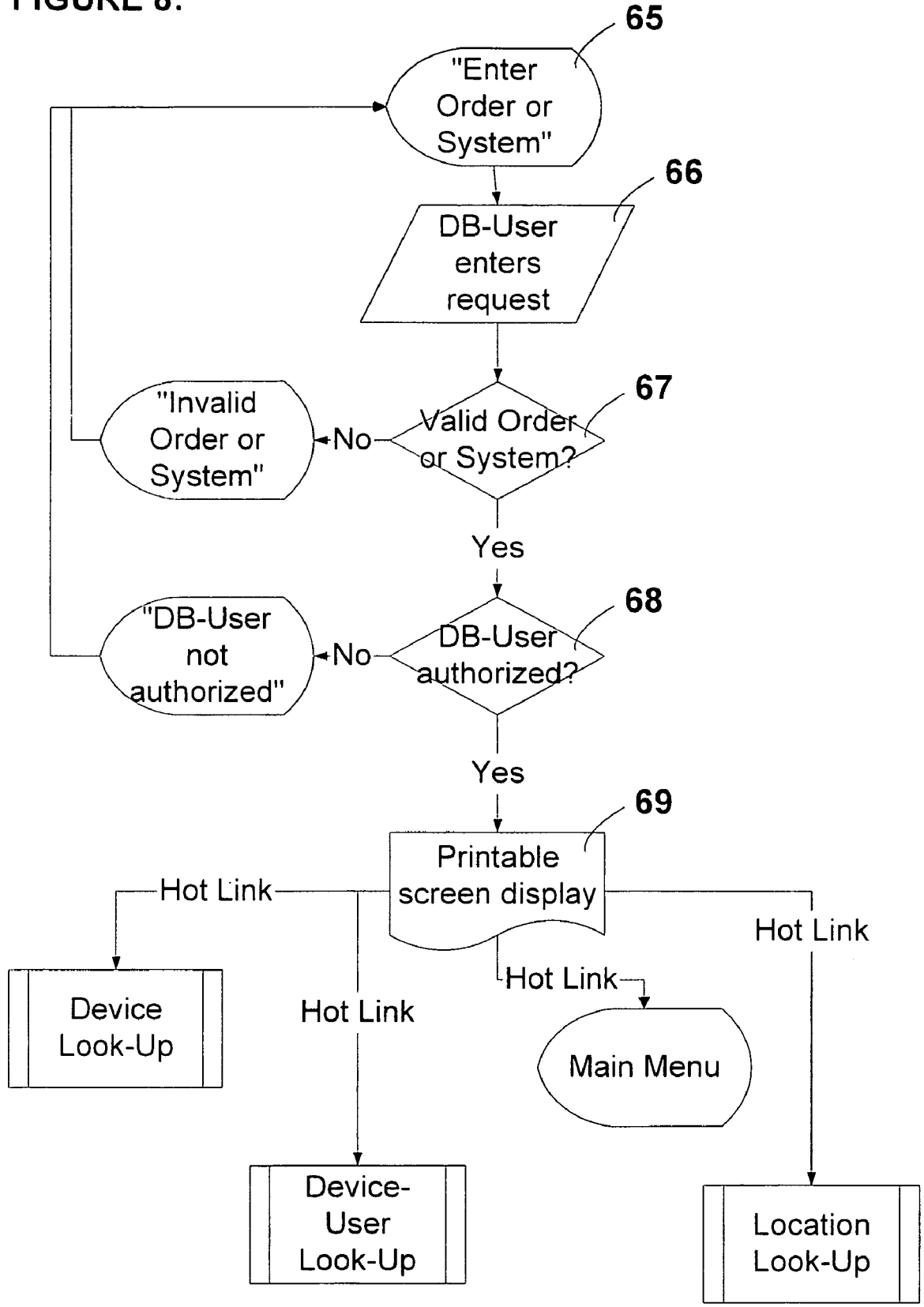

Another look-up process is illustrated in FIG. 8 for viewing overall status of the access control system at 65, such as, current state of master key system in place for different levels, or status of an order placed for new keys to be issued. Thus the DB-User, with proper authorization, may enter a request as at 66, its validity determined at 67, and authorization of User determined at 68. If affirmative, a display will appear at 69 together with standardized hotlinks associated with the displayed information to enable the DB-User to analyze the access control situation.

Figure 9:
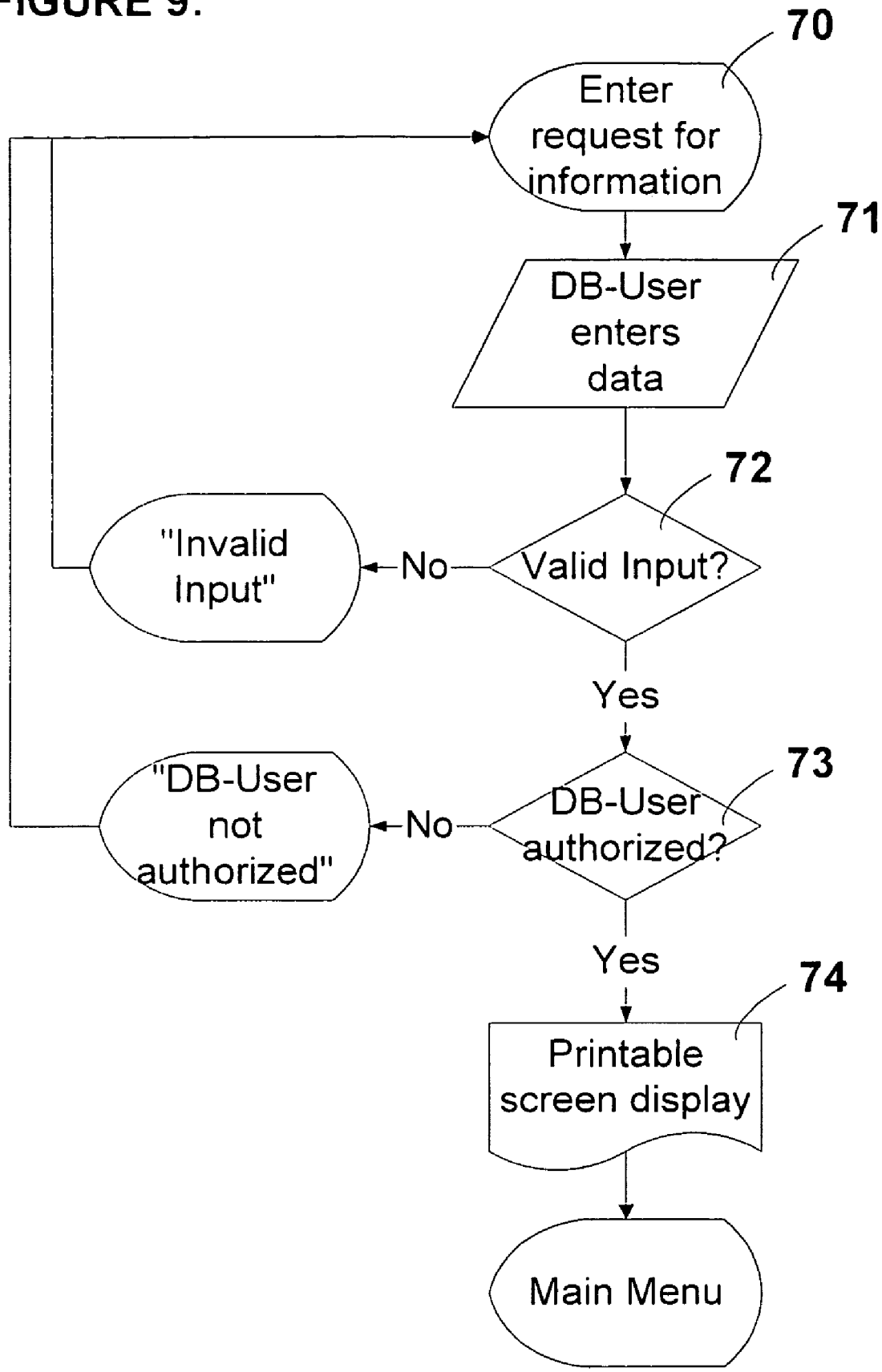

FIG. 9 illustrates other look-up possibilities wherein an input screen is presented at 70 for certain information, the DB-User enters data to be investigated at 71, the data is validated at 72, and authorization determined at 73 leading to display of information requested on the screen 74. The foregoing look-up processes described in relation to FIGS. 4 to 9 are given more for the purpose of illustration and to demonstrate real time data that is available to an authorized DB-User from any Location at any time.

Figure 10:
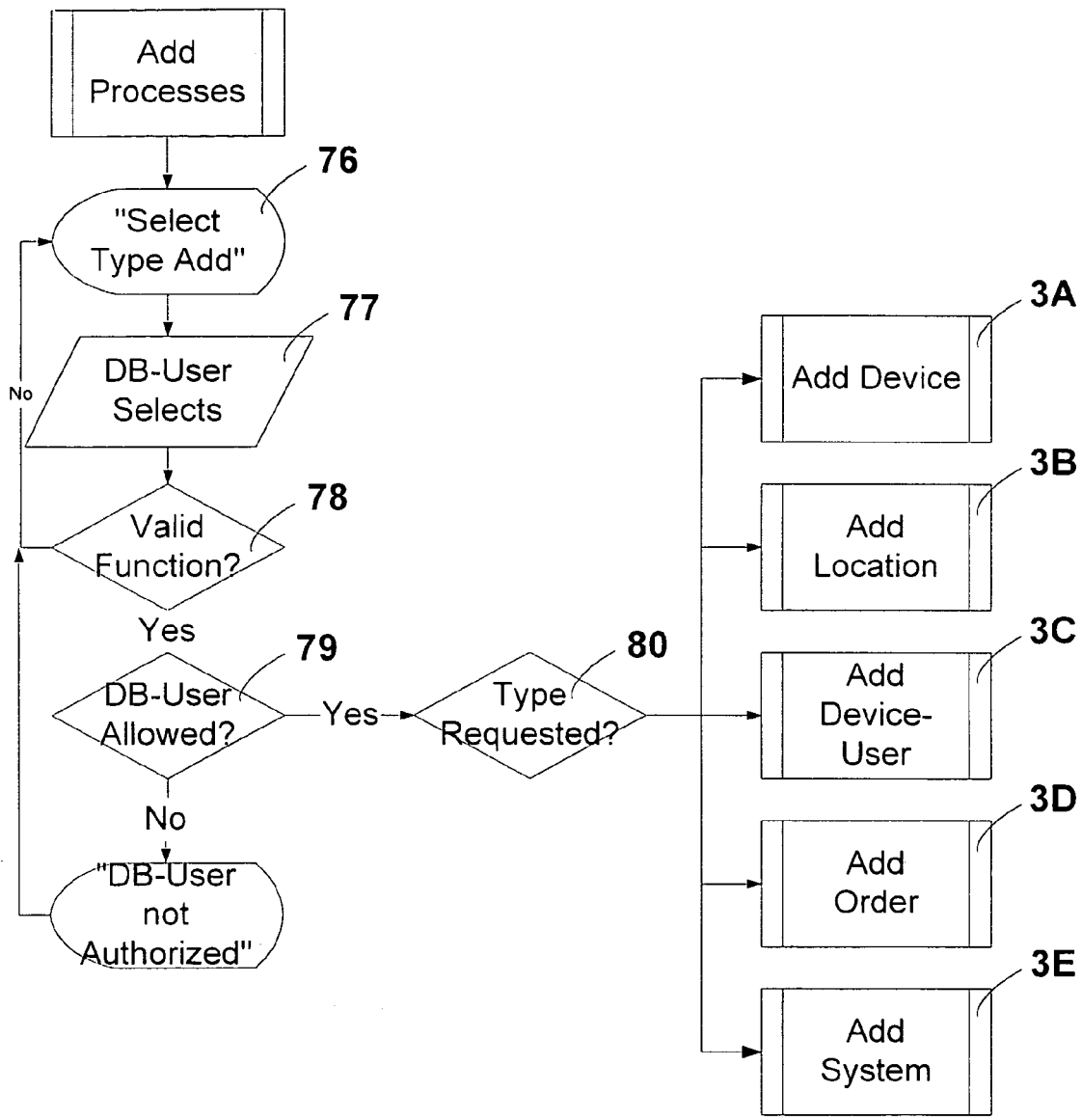
FIG. 10 is a flow diagram for adding functions.

FIG. 10 illustrates the manner in which a new Device (key), Location, or Device-User may be added to a system or new system to a database. Thus, as illustrated at 76, a new Location, order, Device-User or Device is presented for selection by the DB-User, then selected at 77 and valid function determined at 78. Authorization of User is determined at 79 and then the nature of request ascertained at 80 from several different possibilities as designated at 3A, 3B, 3C, 3D and 3E as further illustrated in more detail in FIGS. 11 to 15.

Figure 11:
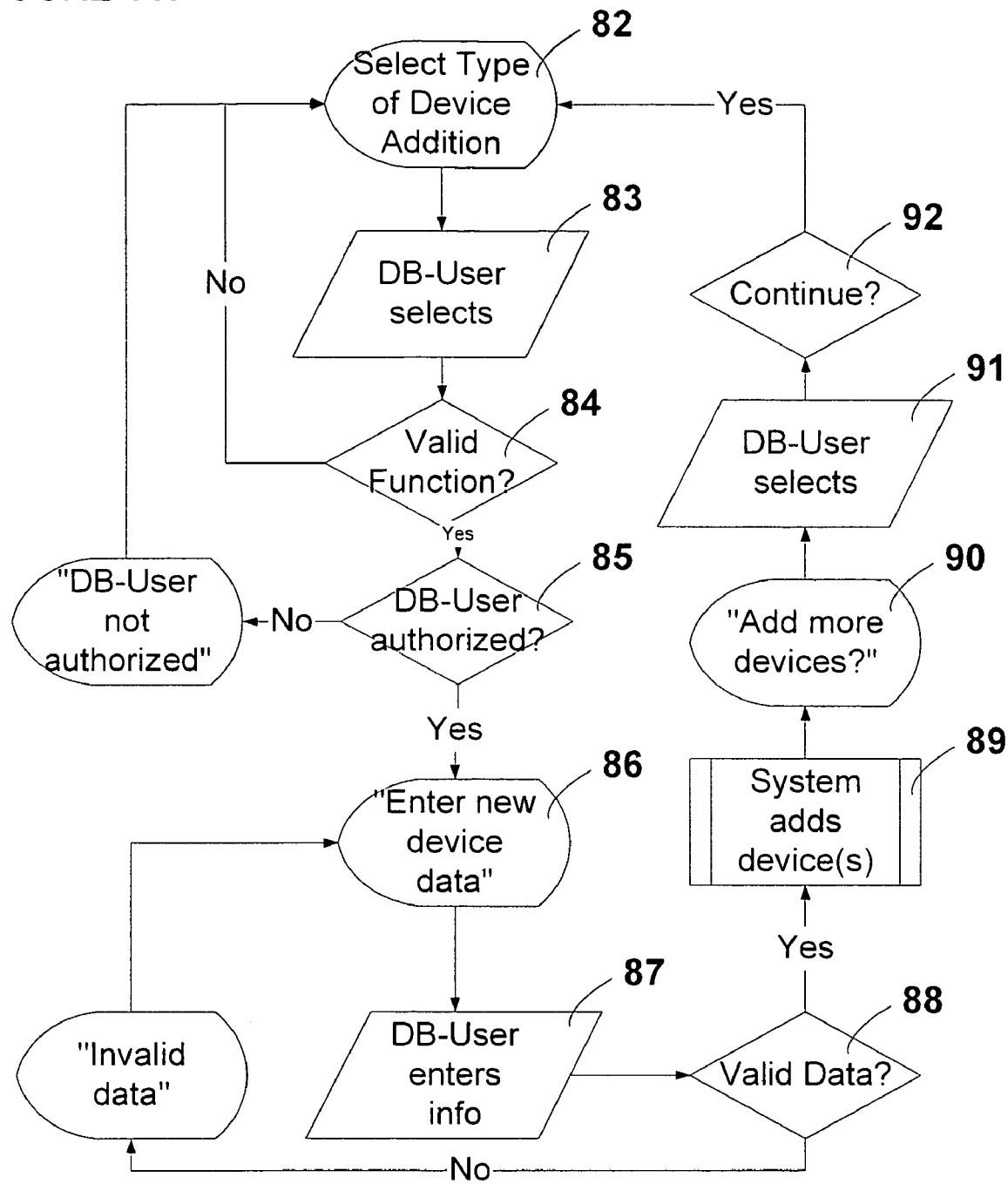
FIG. 11 is a flow diagram directed to the addition of keys or other entry control devices.

In the example given in FIG. 11, the addition of a key blank (an uncut key or unprepared/encoded Device) is recorded by first presenting a menu of Device types for addition at 82, selecting the type of blank to add at 83, verifying that it is a valid function at 84, and that the User is authorized to perform the function at 85. Proper verification results in a blank data entry screen 86 whereby the User enters all relevant data at 87 and the system performs appropriate editing at 88. Once complete, the Software records the entry as at 89 and then inquires whether more such entries are desired or not via 90, 91, and 92.

Figure 12:
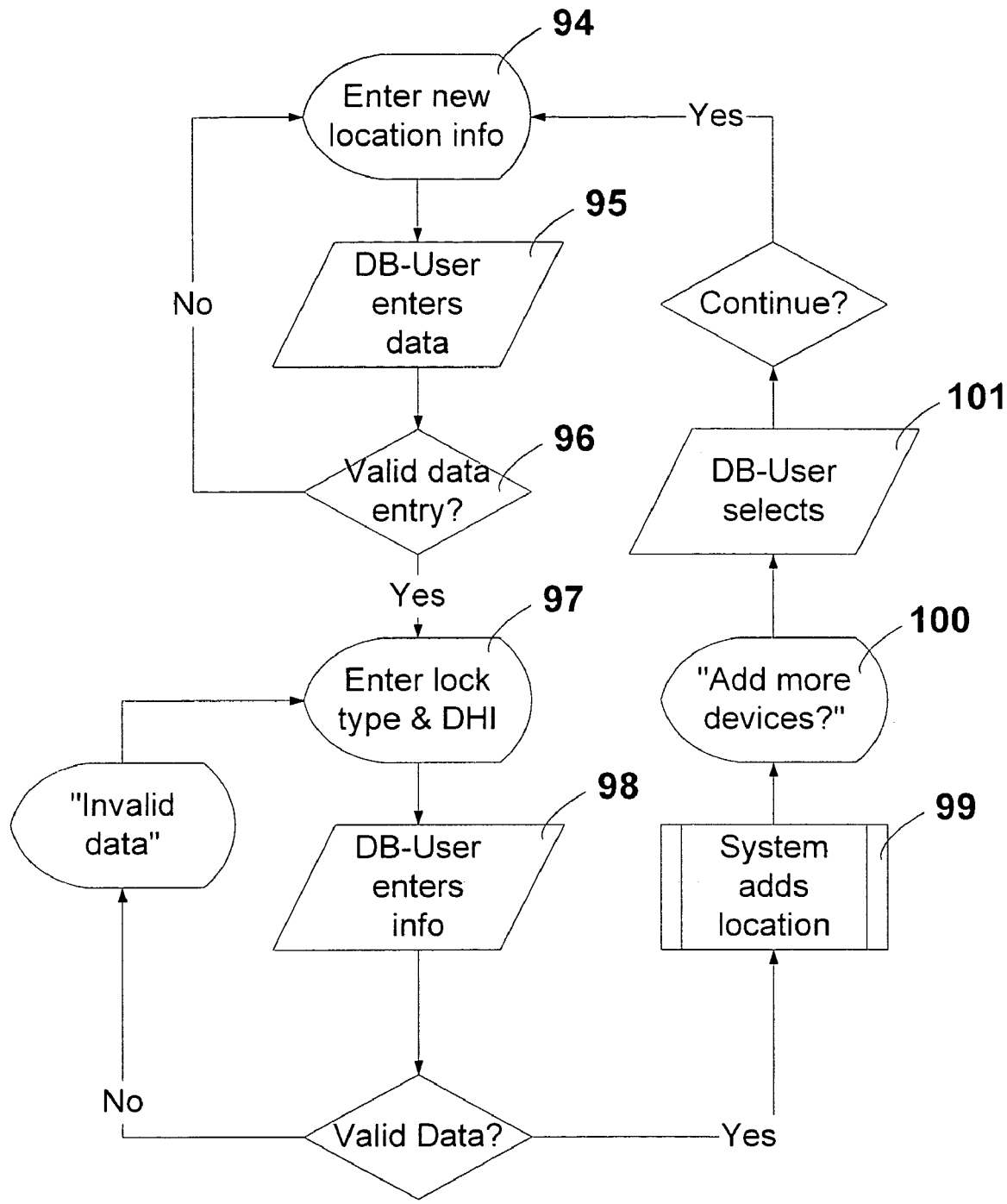
FIG. 12 is a flow diagram representing the addition of a Location.

The process of adding a Location into a particular database is illustrated in FIG. 12 wherein the DB-User enters a new Location at 94 and appropriate data relating to that Location at 95. The data is verified at 96 and then as a response authorized as a DB-User via FIG. 23. Proper verification results in a blank data entry screen 97 and the DB-User enters relevant information at 98, the Software editing in accordance with established database parameters. Once complete, the Software records the entry at 99 and asks the User if more keys or Devices are to be entered as designated in 100, and a selection is made at 101.

Figure 13:
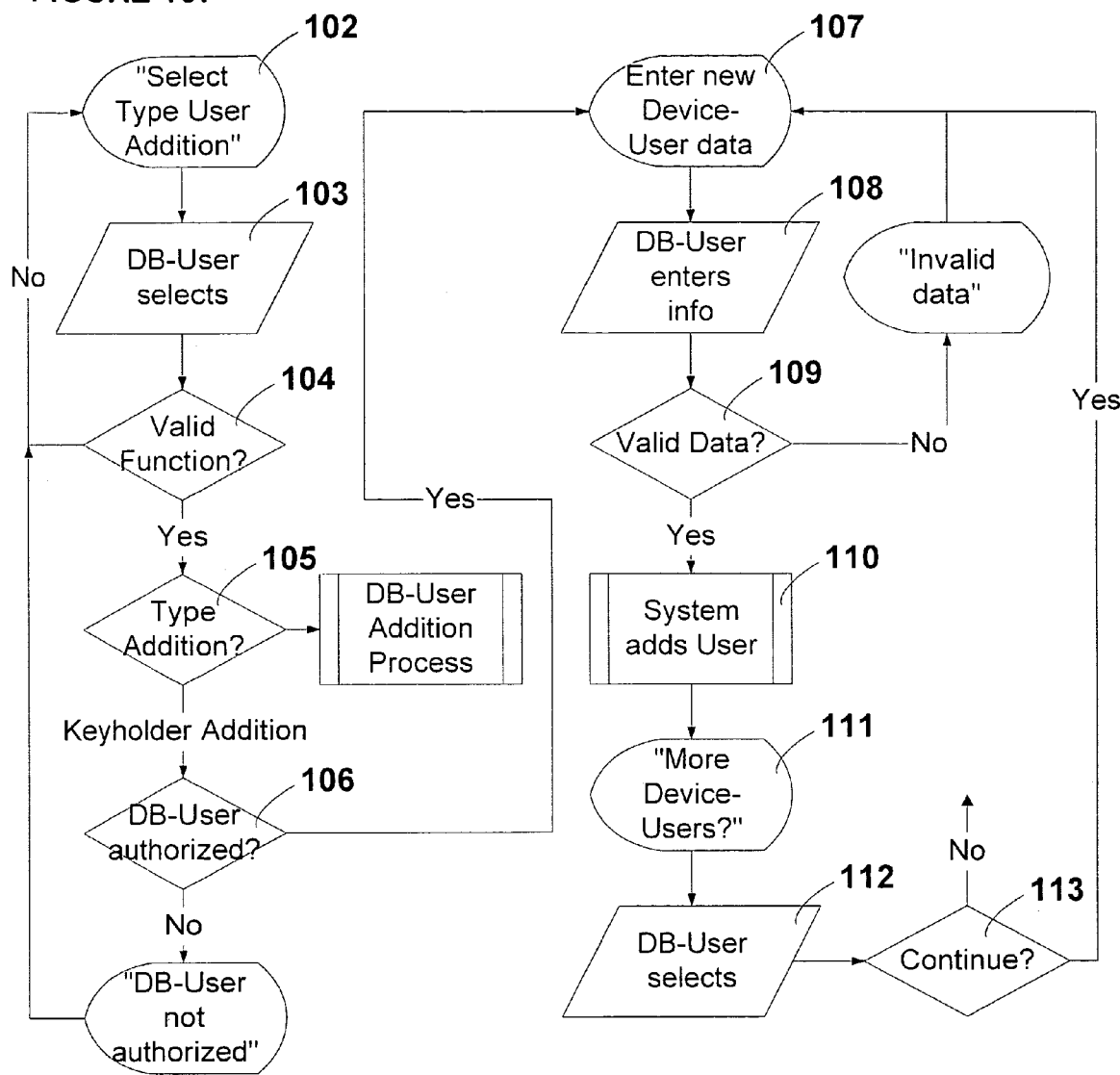
FIG. 13 is a flow diagram representing the addition of a User to access the system.
Figure 19:
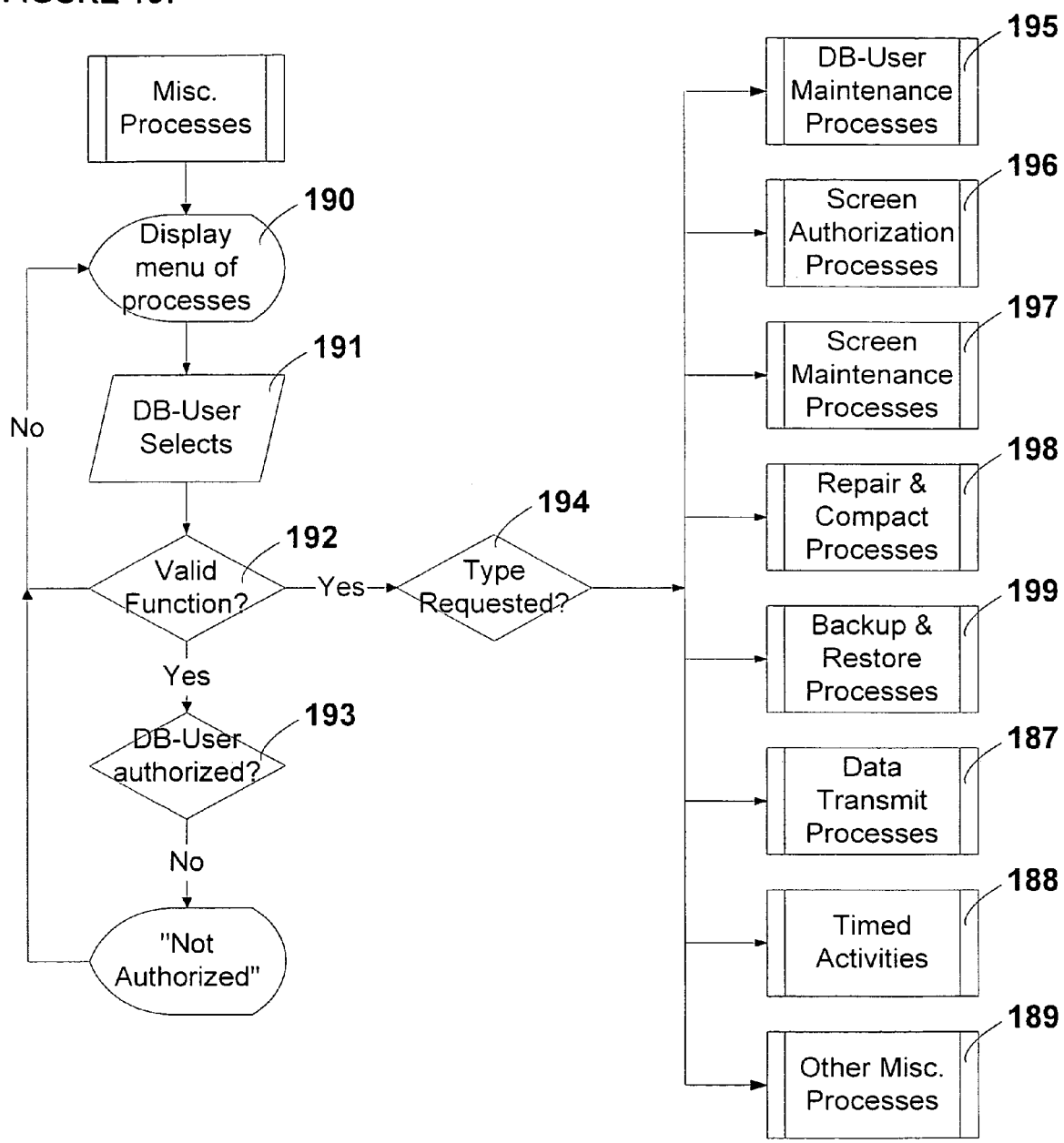
FIG. 19 is a flow diagram of the initial portion of miscellaneous processes built into the data base and verification that the User has authority to select particular routines.

A process similar to that of FIG. 12 is illustrated in FIG. 13 for adding a User at a particular level of security to an existing Location. An authorized DB-User is asked for the type of User to add at 102 and a response is entered at 103. The Software verifies that the function is valid at 104 and determines the type of User addition at 105. If the type of User being added is a new DB-User, Software transfers accordingly (FIG. 19). Otherwise, authorization of the DB-User to add a new Device-User is confirmed at 106. If so authorized, the new Device-User data entry screen is presented at 107, and the DB-User enters all other relevant data at 108 which is verified at 109 and, if accurate and complete, is recorded at 110 in the database. The DB-User is then asked if more Device-Users are to be entered at 111, the DB-User responds at 112 and a decision to add more made at 113 in which event the DB-User is either returned to the data entry routines for new Device-Users at 107 or other available software entry points as selected by the DB-User.

Figure 14:
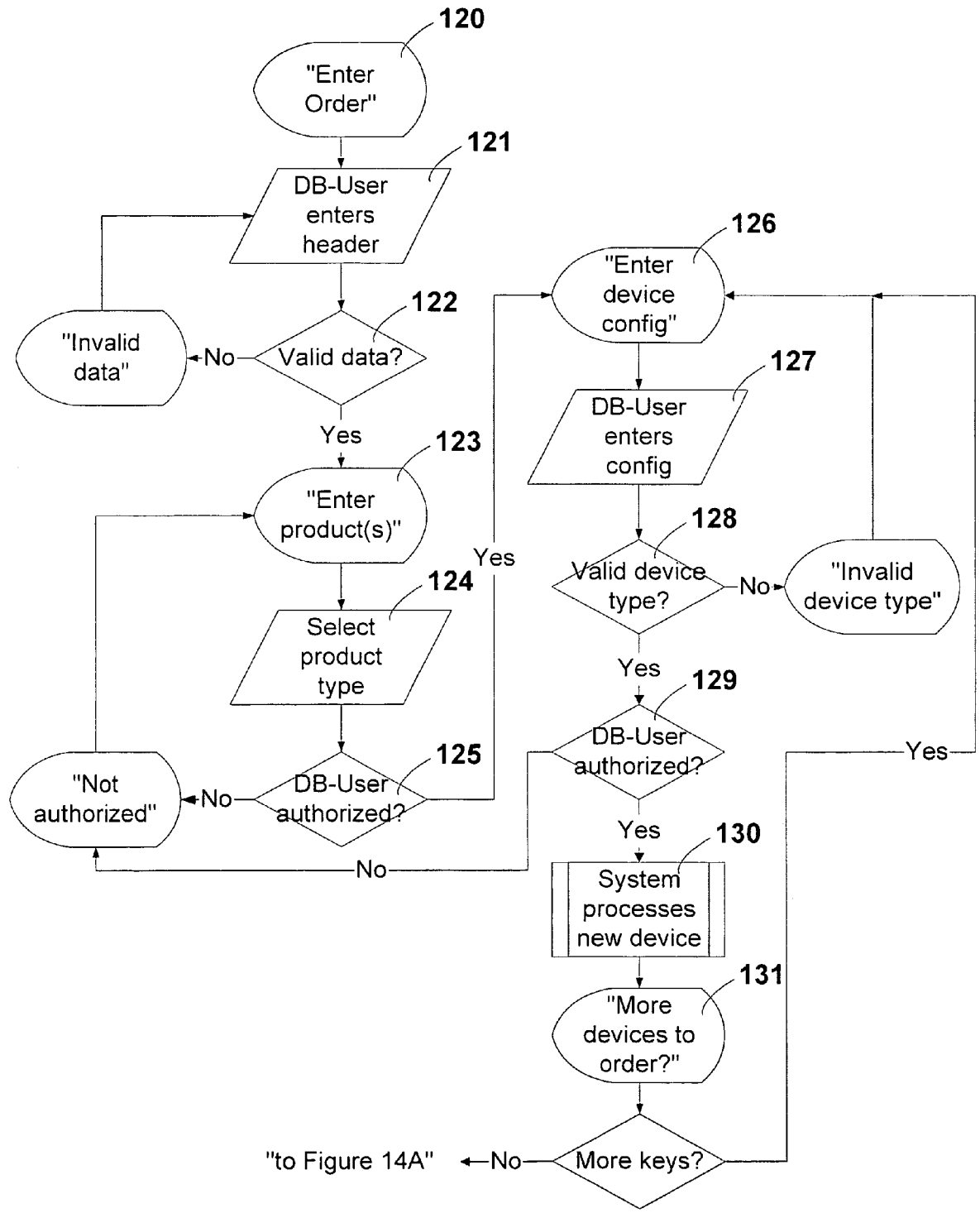

The process of placing an order, for example, a new key for a new Device-User to allow that Device-User access to a specific Location, is illustrated in FIG. 14 wherein the DB-User is presented with a blank order header entry screen at 120. The DB-User enters the appropriate data on the screen as at 121, the Software editing in accordance with established parameters at 122. If all data entry is valid a screen is presented offering choices of product to be ordered at 123 wherein the DB-User makes his selection at 124 and is confirmed for ordering authorization (FIG. 23) at 125. Validated authorization to order a key results in a blank entry screen at 126 by which the DB-User requests the exact key needed in submitting the request at 127, the Software validating the type of key being requested at 128 and that the DB-User has authority to order this type of key at 129. Complete validation results in the Software recording the order at 130, a request to the DB-User if more keys are required at 131 and a decision based on response to repeat the key request portion at 126 or move on to the processing of the order at 132 (FIG. 14A). The DB-User is asked at 132 if he intends to cut the ordered key(s) at a local key cutting machine or transmit a work order digitally to a remote Location wherein a decision is made at 133 to send appropriate codes directly to the key cutting machine at 134 or transmit the order to a remote facility at 135 whereupon cutting of the keys, serial numbers of the blanks used are recorded on the work order at 136. Following completion of the key cutting, the DB-User is required to enter the serial numbers of the blanks from which the key was cut via the input screen at 137, the DB-User enters such serial numbers at 138, and the Software validates that such serial numbers exist for this database at 139. The Software then requires the DB-User to assign such keys to a particular Device-User at 140 and allows the DB-User to then print any relevant reports needed at 141 and 142. The order is then closed at 143 and the DB-User asked if there are more orders to process or not at 144.

Figure 15:
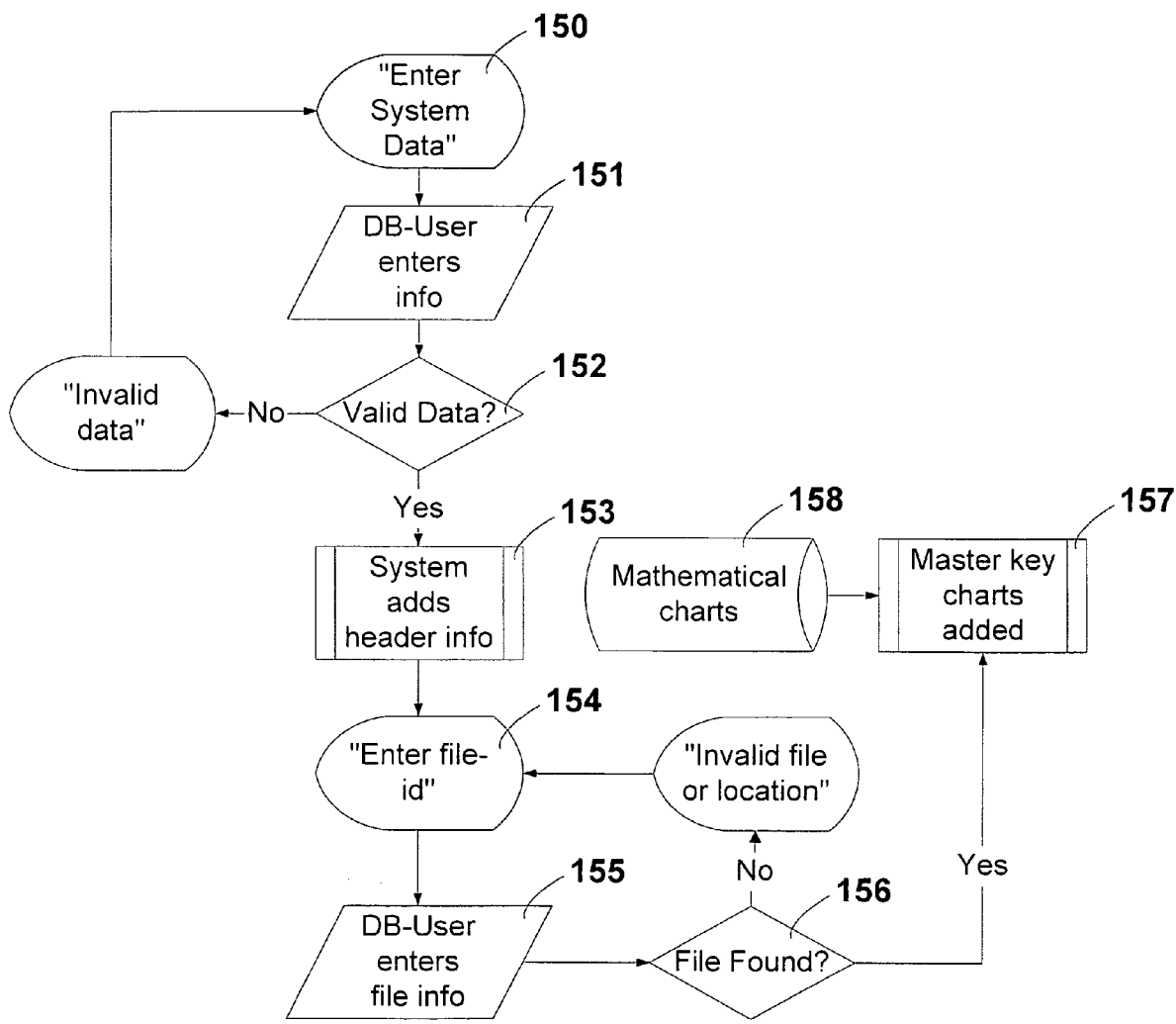
FIG. 15 is a flow diagram representing the addition of a new master key chart into the database for a specific application.

FIG. 15 illustrates the manner in which a new system may be added to the database, such as, master key charts for a secondary campus to be added into the security system. Thus, as illustrated, the DB-User is asked to name the incoming system and system header information at 150 and 151. The Software checks for duplicate system names data integrity in accordance with established criteria at 152 appropriately recording system header information in the database at 153. The DB-User is then asked to direct the Software to the Location of the data files (previously generated using a different software program) being imported at 154 and 155 whereby the Software then locates the file at 156 and imports the data from a source of mathematical charts 158 into the database at 157.

Figure 16:
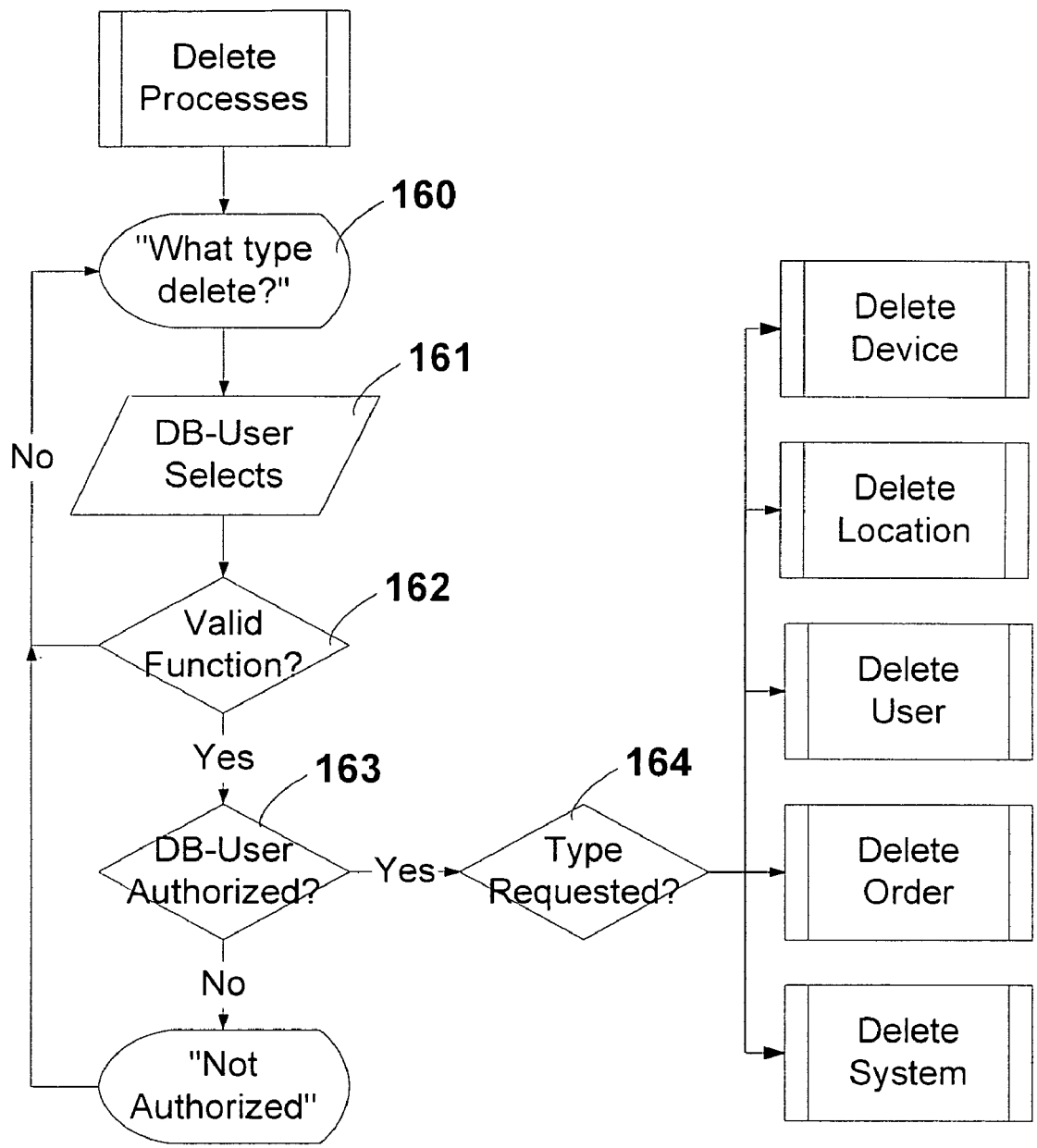
FIG. 16 is a flow diagram for deleting functions from a system.

FIG. 16 illustrates the manner in which a selected Device, Device-User, or Location may be deleted from the database. Thus, as illustrated, a screen is presented of delete types at 160, the DB-User selects the type of deletion desired at 161, the Software confirms the type of deletion at 162, verifies authorization for the requested deletion at 163 (FIG. 23) transferring program logic at 164 to the requested and programmed routine. Said routines are quite similar to various described "Add" routines and therefore are not presented as figures herein.

Figure 17:
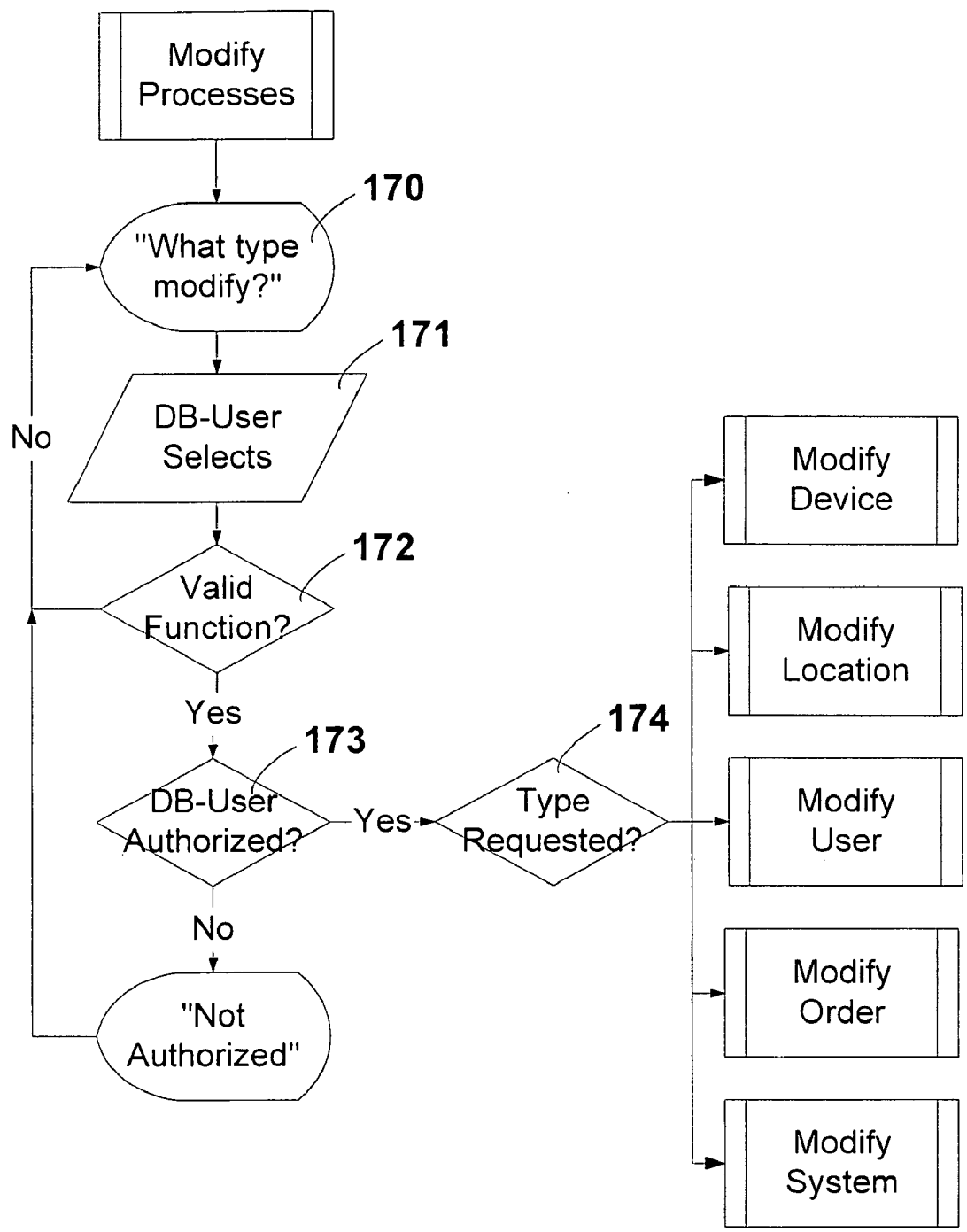
FIG. 17 is a flow diagram of routine modifications to the system.

FIG. 17 illustrates the manner in which a selected Device, Device-User, or Location may be modified from its current form in the database. A screen is presented of modify types at 170, the DB-User selects the type of modification desired at 171, the Software confirms the type of modification at 172, verifies authorization for the requested modification at 173 (FIG. 23) transferring program logic at 174 to the requested and programmed routine. Said routines being quite similar to various described "Add" and "Delete" routines, such individual routines have not been presented as figures herein.

Figure 18:
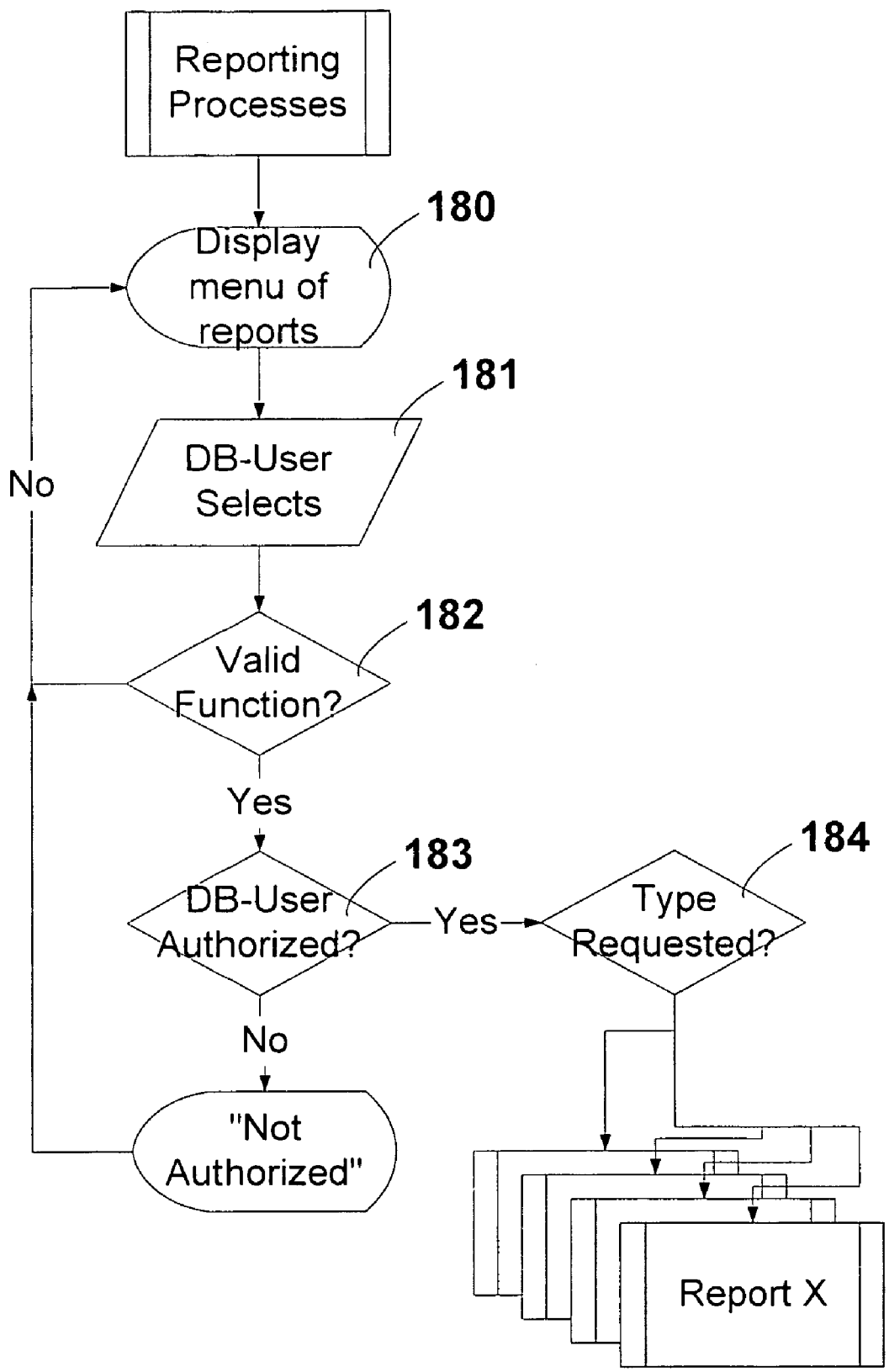
FIG. 18 is a flow diagram of routines for editing reports.

FIG. 18 illustrates the manner in which the DB-User selects a desired report from a variety of preprogrammed reports at 180 and 181, wherein the Software validates the request at 182, confirms authorization of the DB-User for the requested report at 183 (FIG. 23) and generates the requested report at 184. Sample reports include all open orders or order status reports; all active keys used for auditing purposes; work orders, such as, cylinder pinning, device configuration; historical reports, such as, User, Device, Location; Device, Location, User labels; system status reports; key/Device receipt; various packaging formats, such as, step packets, post card transmittals; and various usage and comparative graphs, etc.

Figure 20:
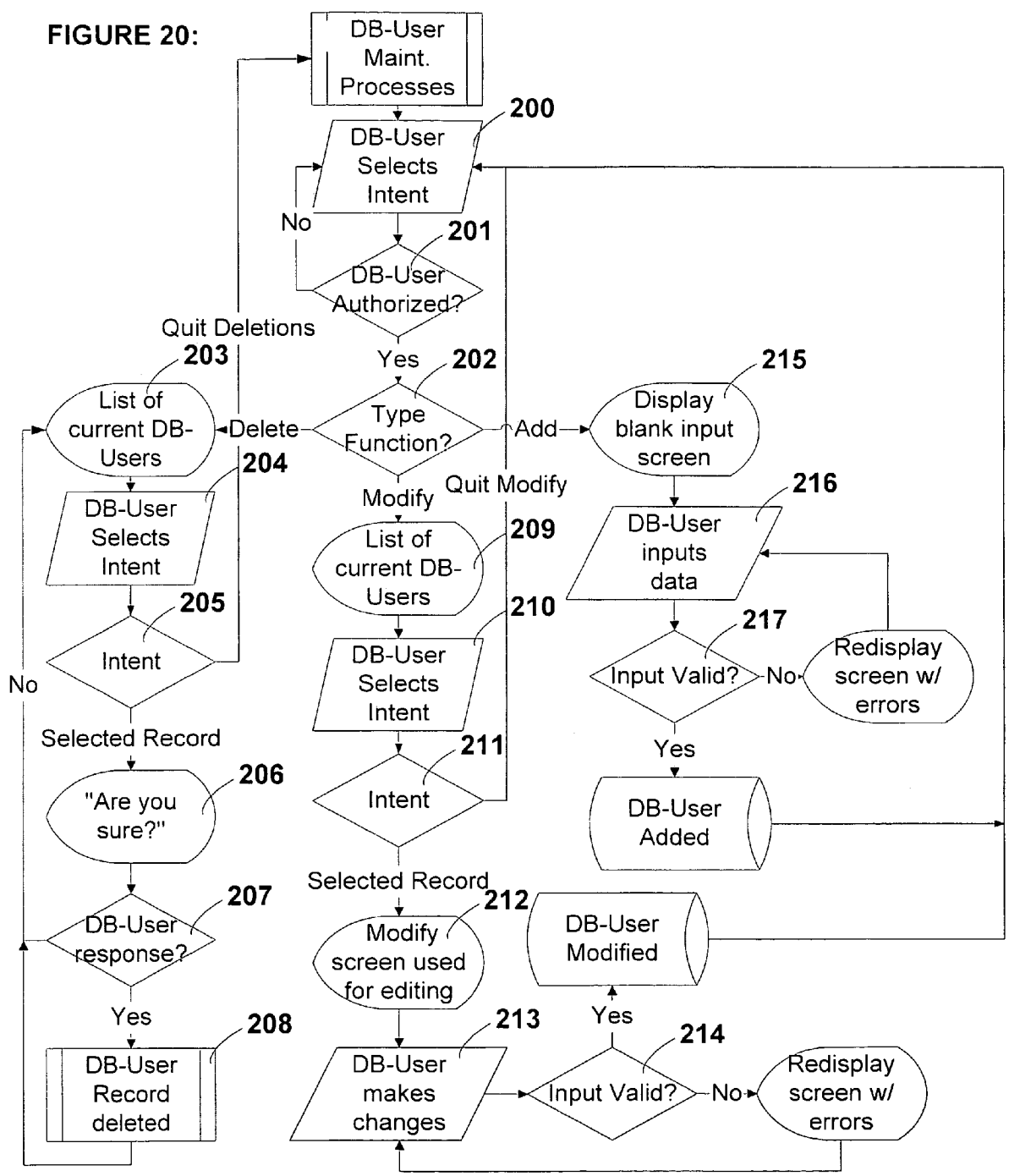
FIG. 20 is a flow diagram of the steps followed to permit a User to modify profiles of other Users.

FIGS. 19 through 23 illustrate the specialized routines used within the Software to fully control access to the stored data by each individual DB-User as well as perform various database related utilities. FIG. 19 illustrates the manner in which the DB-User selects a desired miscellaneous process of programmed processes at 190 and 191, wherein the Software validates the request at 192, confirms authorization of the DB-User for the requested process at 193 (FIG. 23) and transfers program logic to the requested and authorized process at 194. Sample processes include: DB-User Maintenance at 195, the process by which a DB-User is actually identified and structured as an authorized DB-User as shown in FIG. 20; screen authorization at 196, the process by which a DB-User is assigned various screen privileges such as add, modify, view, delete as in FIG. 21; screen maintenance at 197, the process by which screen displays are physically configured to meet the authorization requirements of a particular DB-User as in FIG. 22; various database maintenance routines as indicated at 198 and 199 and other preprogrammed processes not directly tied to the maintenance and control of the key management program (Devices, Locations and Users) as designated at 187, 188 and 189.

A real time activity reporting function of the present invention may be implemented into the flowchart shown in FIG. 19 as a process which is performed by the Software upon validation of the function at 192. As discussed above, the process would include retrieving one or more types of data on Locations, Devices, and/or DB Users showing activity within a selected time period, and displaying that information in a report.

FIG. 20 illustrates the process by which an authorized DB-User adds, modifies or deletes other DB-User profiles in the Security Tables of FIG. 24. The DB-User is presented with a menu of options at 200 with authorization confirmed at 201 and functionally transferred at 202 to the appropriate routine ("Add", "Modify", "Delete"). If the authorized DB-User selected "Delete", he is presented at 203 with a list of all recorded DB-Users whereby he selects the appropriate record for deletion or quits the deletion process at 204. If the selection is that of a record at 205, the DB-User is then asked "Are you sure?" at 206, with an affirmative response at 207 resulting in the selected DB-User record being deleted from the Profile Table at 208 and program control shifted back to the list of DB-Users at 203. If the authorized DB-User selected "Modify", he is presented at 209 with a list of all recorded DB-Users whereby he selects the appropriate record for modification or quits the modification process at 210 with appropriate program transfer occurring at 211. If a record was selected for modification, the DB-User is presented with an entry screen bearing all currently recorded data for the selected DB-User at 212 whereby the DB-User makes required changes at 213, the system verifies data integrity at 214 properly recording the modification if all is accurate or returning appropriate error messages if not. If the authorized DB-User opted to add a new DB-User at 200, the Software presents an empty profile entry screen at 215 whereby the DB-User would enter relevant data at 216 and such data validated at 217, properly recording the addition if all is accurate or returning appropriate errors messages if not.

Figure 21:
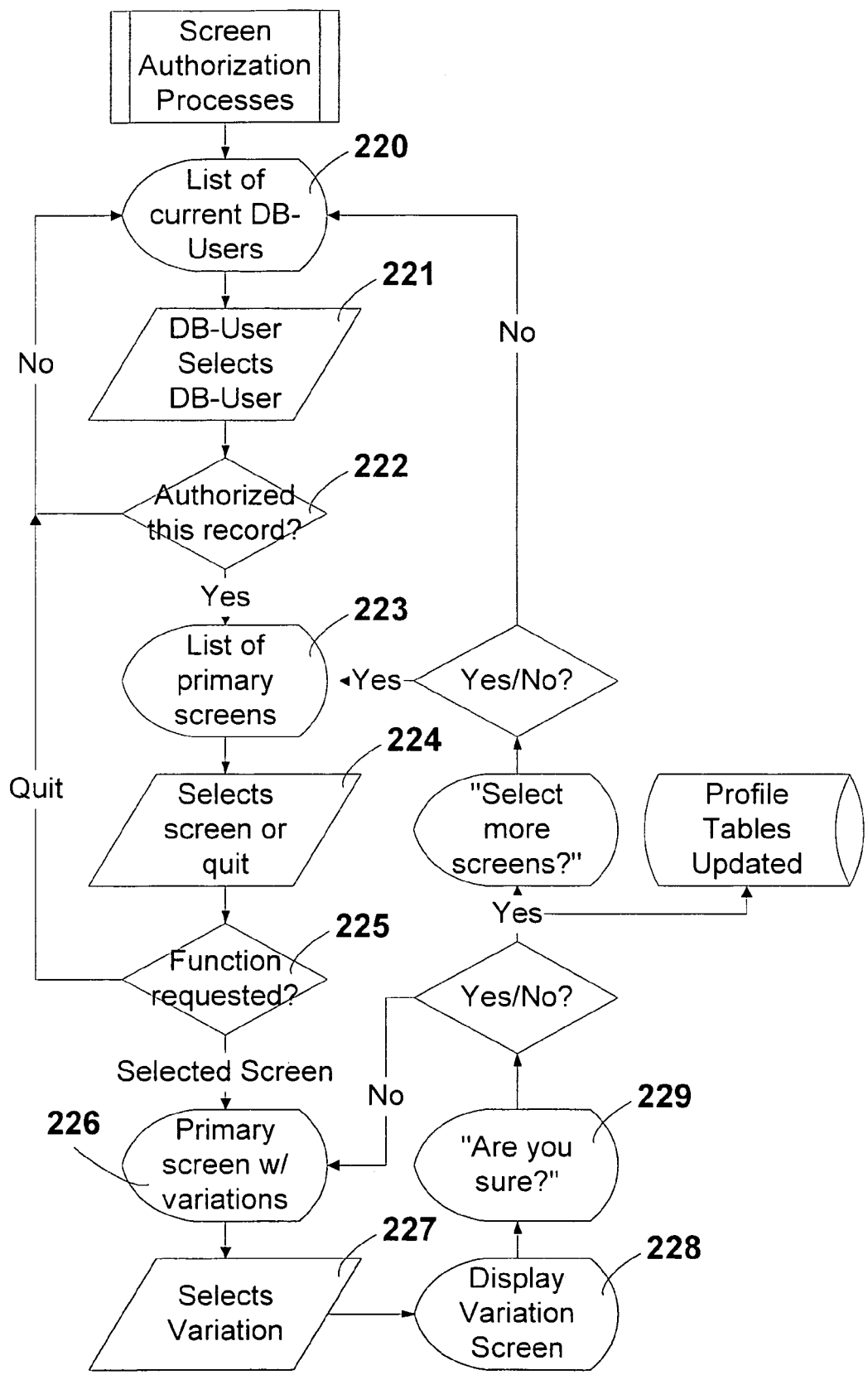
FIG. 21 is a flow diagram of the steps followed to alter screen privileges for each User.

FIG. 21 illustrates the program logic used by which the authorized DB-User configures the Software to present certain screens and certain Variations of screens for the selected DB-User. At 220, the DB-User is presented a list of all DB-Users from which to select the DB-User at 221 for which changes are to be made. The system then confirms the authority of the DB-User relative to the selected DB-User at 222, presenting then a list of primary screens available at 223 if so authorized. The DB-User then selects a screen or quit at 224 whereby the system transfers accordingly at 225. If the DB-User selected a primary screen, the system then displays a list of prepared variations to this primary screen at which point the DB-User selects the desired variation at 227, a sample variation screen is displayed at 228 along with a confirmation message at 229. Depending upon confirmation or not, programmed functions then modify the DB-User record accordingly or transfer program logic to continuation or termination of these screen authorization routines.

Referring to FIG. 24, DB-User 1 typically is a Manager or Security Director of the User company who is programmed to be able to use all three Primary screens meaning he can see all (data) and do (view, modify, add, delete) everything. DB-User 2 typically may be an assistant to a Manager who is programmed to perform any function on Primary Screen 1 but can only use Primary Screen 2 as Variation 1, Variation 1 having been previously defined by field as to what the individual can see (data) and do (view, add, modify, delete) by field.

Figure 22:
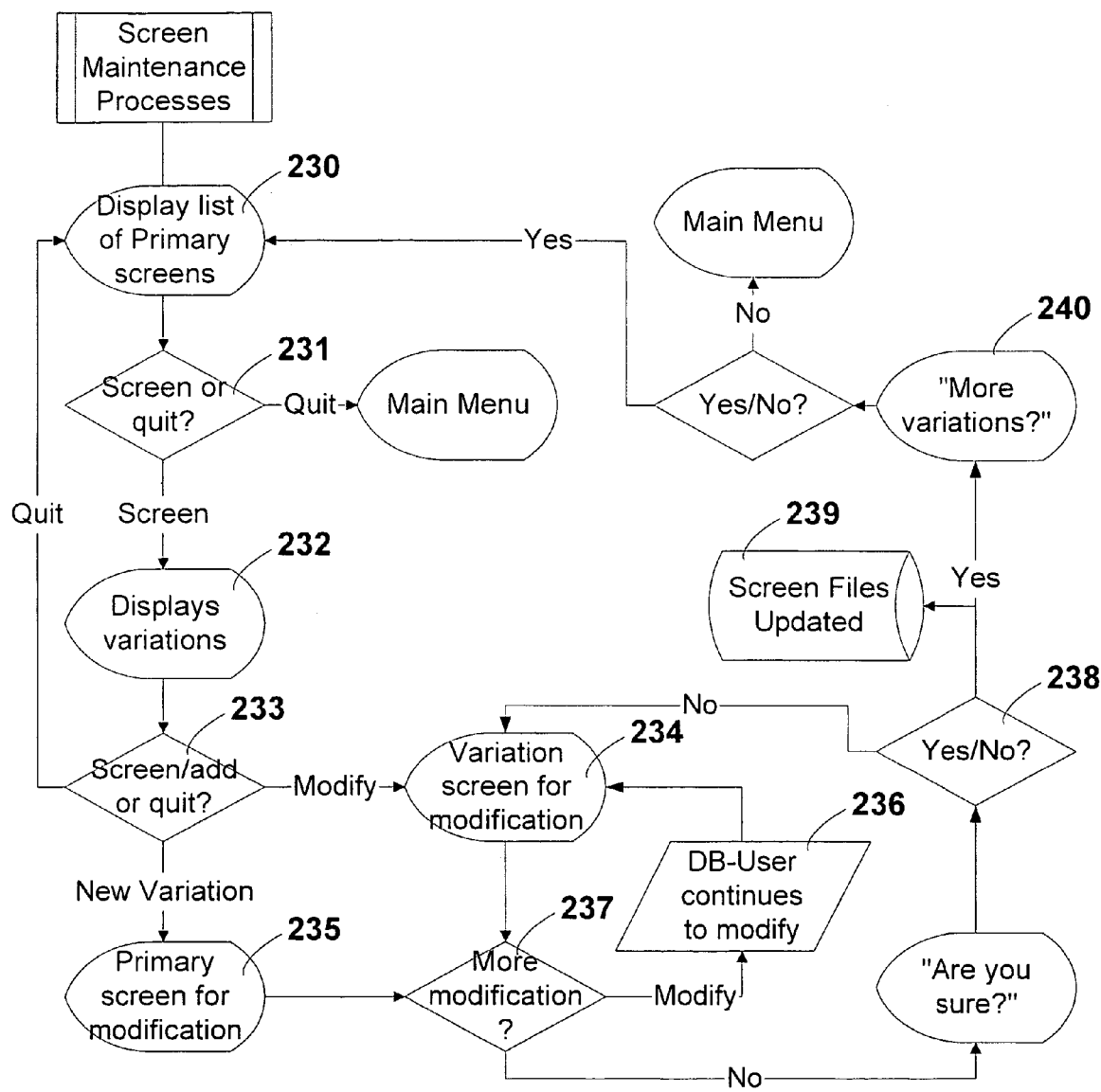
FIG. 22 is a flow diagram of routines built into the data base by which a User can modify a specific screen.

FIG. 22 illustrates the process flow by which a managing DB-User can create customized Variations of Primary Screens such that a specific DB-User can only see or do exactly what the managing DB-User authorizes another DB-User to see and do. At 230, the managing DB-User is presented with a list of all Primary Screens of which those Primary Screens with already established Variations have been highlighted to inform the DB-User that Variations of that Primary Screen are already available. The managing DB-User selects the Primary Screen from which he wishes to concentrate at 231, subsequently selecting to modify an existing Variation from a drop down list of Variations in 232 or to create a new Variation. At 233, the Software determines based upon the DB-User selection to present the selected Variation for modification at 234 or the selected Primary Screen for creation of a totally new Variation at 235. At 234 or 235, the managing DB-User is allowed to alter each field of the selected screen Variation in order to describe Add, Modify, View or Delete privileges, by field as well as define data delimiters (e.g. only data for a specific department). Upon completion of the field-by-field modifications, the managing DB-User views a current version from which to determine if more modifications are required or not at 237 with confirmation at 238, at which point, the screen is permanently recorded in the screens file at 239 and the managing DB-User presented with the option to do more screen variations or not at 240.

Referring back to the definition of Device-User, FIG. 25 graphically depicts different typical Device-User situations but is not intended to be limiting on the number of applications possible for Device-Users. In a corresponding manner to that described with respect to FIG. 24, it is possible to control the level of access of each Device-User to one or more secured Locations based on the password assigned to that Device-User. The Device-User also may be given additional privileges corresponding to those of the DB-User according to the password assigned. From the foregoing, there has been set forth and described an internet-based access control system that dynamically links the three primary elements of any access control system, namely, people, places and devices used to allow access in such a way as to deliver need-to-know information to any authorized individual from any authorized internet access point. Thus, it is possible to manage access controlled data by way of the internet in a real time mode.

In the Example previously given on page 14 of a DB-User in Rome, Italy confronted with an immediate need to add or replace a key to a given location in Rome, the User may gain immediate access via the global communication network to the data needed in another remote location, such as, Los Angeles, Calif., with respect to the new key. Upon proper authorization of the logged-in, Rome-based DB-User, a key (Device) can be ordered immediately and the details needed to prepare the device can be routed to the Device preparation facility nearest to Rome. That facility configures the Device, immediately recording the activity along with all configuration parameters and sends the Device to Rome. Upon receipt, Rome hands the newly created Device to a Device-User and records the activity. Throughout the entire Example, every individual with authorized privileges has access to the information as it occurred, namely, that a new key was ordered in Rome at a given hour of a given day, that a Device was prepared, recorded and shipped to Rome, whereupon receipt of the new Device, was handed to the person authorized to receive it. Thus "real time" means the actual digitized activity as it occurs being made available to whomever is authorized to view such data from wherever that DB-User may be located while maintaining a single database of information.

A system and method if further provided for DB Users to monitor activities occurring in a system such as, for example, disclosed in the '672 application, on a real time basis. That is, for example, a DB User may choose a period of time and view a report on any activity represented by stored information or data associated with, for example, a given Location, group of Locations, or an entire operation (which may, for example, be a corporation with a number of different Locations, such as divisions, plants or stores).

As additional examples, a retail operation may have a large number of Locations, such as individual stores, which are undergoing either rekeying or new lock installations. A real time activity report related to such an operation would enable a DB User to select a desired time period and report data (according to a DB User's authorized access level to the system) associated with that time period. This data may, for example, report on an entire organizational operation, such as by reporting how many Locations have been rekeyed to date (or during another selected time period) or installed with new access control Devices to date (or during another selected time period) versus how many Locations have yet to be rekeyed or to have new Devices installed. To enable this type of activity reporting, Software of the system enables the DB User to search the database for the desired data, such as all orders fulfilled within a selected time period. The software formats the data into a report which is displayed to the DB User. Any activity or information which has been stored in the database in an appropriately categorized or formatted manner may then be quickly searched for activity within a selected time period and then displayed or reported in any desired manner to the DB User. Generally, such data may relate to the operation and/or security of one or more Locations, or to the general management or financial impact of activities represented in stored data involving Device-Users and/or DB Users, and/or Devices and/or Locations during the selected time period.

In particular, the real time activity reporting function of the present invention may be implemented into the flowchart shown in FIG. 19 as a process which is performed by the Software upon validation of the function at 192. As discussed above, the process would include retrieving one or more types of data on Locations, and/or Devices, and/or Device-Users, and/or DB Users showing activity within a selected time period, and displaying that information in a report. The activity or information may include any time dependent data that is entered into the database(s) as, for example, described herein.

As employed herein, the term "global communications network" may refer to intranet as well as internet usage. It is therefore to be understood that while preferred and alternate forms of the invention are herein set forth and described, the above and other modifications and changes may be made without departing from the spirit and scope of the present invention.

While the present invention has been illustrated by a description of various preferred embodiments and while these embodiments has been described in some detail, it is not the intention of the Applicant to restrict or in any way limit the scope of the appended claims to such detail. Additional advantages and modifications will readily appear to those skilled in the art. The various features of the invention may be used alone or in numerous combinations depending on the needs and preferences of the user. This has been a description of the present invention, along with the preferred methods of practicing the present invention as currently known. However, the invention itself should only be defined by the appended claims, wherein we claim:

1. An interactive system for security management via a communications network by a plurality of Database Users and adapted to manage a security system associated with places physically protected by corresponding security mechanisms used to gain physical entry to the places by security mechanism users the system comprising in combination:
    at least one searchable database configured to store information on a plurality of places, a plurality of security mechanisms and a plurality of security mechanism users, wherein the at least one searchable database is further configured to store information on the plurality of Database Users authorized to access the at least one searchable database, and
    at least one computer coupled to the at least one searchable database and configured to execute Software accessible by the plurality of Database Users, the Software configured to produce a real time activity report on a selected portion of the stored information during a time period selected by a Database User among the plurality of Database Users, wherein the real time activity report includes information regarding security mechanism maintenance activities for a plurality of security mechanisms at a plurality of places.

2. The system according to claim 1, wherein the plurality of security mechanisms includes an entry control Device comprising a tangible item containing encoded criteria.

3. The system according to claim 2, wherein the tangible item is selected from the group consisting of a key, an access card, a chip and bar code.

4. The system according to claim 1, wherein the plurality of security mechanisms includes an entry control Device comprising an intangible object assigned to and in possession of a Device-User.

5. The system according to claim 4, wherein the object is selected from the group consisting of code numbers, PIN numbers and code words or phrases.

6. The system according to claim 1, wherein the information regarding security mechanism maintenance activities includes information regarding how many security mechanisms have been rekeyed.

7. The system according to claim 6, wherein the information regarding security mechanism maintenance activities includes information regarding how many security mechanisms have been rekeyed during the selected time period.

8. The system according to claim 6, wherein the information regarding security mechanism maintenance activities includes information regarding how many security mechanisms have been rekeyed to date.

9. The system according to claim 1, wherein the information regarding security mechanism maintenance activities includes information regarding how many places have had new security mechanisms installed.

10. The system according to claim 1, wherein the information regarding security mechanism maintenance activities includes information regarding how many places have had new security mechanisms installed during the selected time period.

11. The system according to claim 10, wherein the information regarding security mechanism maintenance activities includes information regarding how many places have had new security mechanisms installed to date.

12. The system according to claim 10, wherein the information regarding security mechanism maintenance activities includes information regarding how many installation orders have been fulfilled.

13. The system according to claim 12, wherein the information regarding security mechanism maintenance activities includes information regarding how many installation orders have been fulfilled during the selected time period.

14. The system according to claim 12, wherein the information regarding security mechanism maintenance activities includes information regarding how many installation orders have been fulfilled to date.

15. The system according to claim 1, wherein the information regarding security mechanism maintenance activities includes information regarding a group of Locations in an organization.

16. The system according to claim 15, wherein the information regarding security mechanism maintenance activities includes information regarding how many Locations in the group have been rekeyed versus how many Locations in the group have yet to be rekeyed.

17. The system according to claim 15, wherein the information regarding security mechanism maintenance activities includes information regarding how many Locations in the group have had new security mechanisms installed versus how many Locations in the group have yet to have new security mechanisms installed.

18. An interactive system for security management via a communications network by a plurality of Database Users and adapted to manage a security system associated with places physically protected by corresponding security mechanisms used to gain physical entry to the places by security mechanism users, the system comprising in combination:
- a plurality of databases having different levels of access; and
- at least one computer coupled to plurality of databases and configured to execute Software configured to assign a password to each of a plurality of Database-Users corresponding to one of said levels of access;
- wherein information is maintained in said plurality of databases on a plurality of places, a plurality of security mechanisms and a plurality of security mechanism users, wherein at least one database is further configured to store information on the plurality of Database Users authorized to access the plurality of databases, and wherein said Software is further configured to search and display selected portions of said data stored in said plurality of databases related to a period of time selected by one of the Database-Users, wherein the selected portions of said data includes real time information regarding security mechanism maintenance activities for a plurality of security mechanisms at a plurality of places.

19. A method of reporting maintenance activities in an interactive system for security management, the system accessible via a communications network by a plurality of Database Users and adapted to manage a security system associated with places physically protected by corresponding security mechanisms used to gain physical entry to the places by security mechanism users, wherein the interactive system includes at least one searchable database configured to store information on a plurality of places, a plurality of security mechanisms and a plurality of security mechanism users, and wherein the at least one searchable database is further configured to store information on the plurality of Database Users authorized to access the at least one searchable database, the method comprising:
- authenticating a Database User attempting to connect to the interactive system over the communications network by receiving a password from the Database User and comparing the received password to a password stored in the at least one searchable database;
- after authenticating the Database User, and in response to input from the Database User, producing a real time activity report on a selected portion of the stored information during a time period selected by the Database User, wherein the real time activity report includes information regarding security mechanism maintenance activities for a plurality of security mechanisms at a plurality of places.

20. The method according to claim 19, wherein the information regarding security mechanism maintenance activities includes information regarding how many security mechanisms have been rekeyed.

21. The method according to claim 20, wherein the information regarding security mechanism maintenance activities includes information regarding how many security mechanisms have been rekeyed during the selected time period.

22. The method according to claim 20, wherein the information regarding security mechanism maintenance activities includes information regarding how many security mechanisms have been rekeyed to date.

23. The method according to claim 19, wherein the information regarding security mechanism maintenance activities includes information regarding how many places have had new security mechanisms installed.

24. The method according to claim 23, wherein the information regarding security mechanism maintenance activities includes information regarding how many places have had new security mechanisms installed during the selected time period.

25. The method according to claim 23, wherein the information regarding security mechanism maintenance activities includes information regarding how many places have had new security mechanisms installed to date.

26. The method according to claim 19, wherein the information regarding security mechanism maintenance activities includes information regarding how many installation orders have been fulfilled.

27. The method according to claim 26, wherein the information regarding security mechanism maintenance activities includes information regarding how many installation orders have been fulfilled during the selected time period.

28. The method according to claim 26, wherein the information regarding security mechanism maintenance activities includes information regarding how many installation orders have been fulfilled to date.

29. The method according to claim 19, wherein the information regarding security mechanism maintenance activities includes information regarding a group of Locations in an organization.

30. The method according to claim 29, wherein the information regarding security mechanism maintenance activities includes information regarding how many Locations in the group have been rekeyed versus how many Locations in the group have yet to be rekeyed.

31. The method according to claim 29, wherein the information regarding security mechanism maintenance activities includes information regarding how many Locations in the group have had new security mechanisms installed versus how many Locations in the group have yet to have new security mechanisms installed.

* * * * *